United States Patent
Tomita et al.

[11] Patent Number: 6,111,917
[45] Date of Patent: Aug. 29, 2000

[54] IMAGE COMMUNICATION SYSTEM AND METHOD

[75] Inventors: Yasuhiro Tomita; Tsukasa Kimura, both of Yokosuka; Hideaki Kimata, Yokohama; Ryota Suzuki, Zushi; Takaaki Akimoto; Tadashi Ichikawa, both of Yokohama, all of Japan

[73] Assignee: Nippon Telegraph and Telephone Corporation, Tokyo, Japan

[21] Appl. No.: 09/029,215

[22] PCT Filed: Jul. 4, 1997

[86] PCT No.: PCT/JP97/02320

§ 371 Date: Feb. 25, 1998

§ 102(e) Date: Feb. 25, 1998

[87] PCT Pub. No.: WO98/02002

PCT Pub. Date: Jan. 15, 1998

[30] Foreign Application Priority Data

Jul. 5, 1996 [JP] Japan .................................. 8-176052

[51] Int. Cl.[7] .................................................. H04N 7/36
[52] U.S. Cl. .................................. 375/240.27; 348/845.1
[58] Field of Search ........................... 375/240, 240.01, 375/240.12, 240.26, 240.27; 348/384.1, 390.1, 400.1, 401.1, 402.1, 409.1, 415.1, 416.1, 845, 845.1

[56] References Cited

U.S. PATENT DOCUMENTS

| | | | |
|---|---|---|---|
| 5,719,646 | 2/1998 | Kikuchi et al. ....................... | 348/845.1 |
| 6,040,879 | 3/2000 | Park ....................................... | 348/409 |
| 6,049,570 | 4/2000 | Fukunaga ............................... | 348/415 |

FOREIGN PATENT DOCUMENTS

| | | |
|---|---|---|
| 57-63978 | 4/1982 | Japan . |
| 62-137983 | 6/1987 | Japan . |
| 62-200994 | 9/1987 | Japan . |
| 3-259688 | 11/1991 | Japan . |
| 4-101590 | 4/1992 | Japan . |
| 4-297194 | 10/1992 | Japan . |
| 6-30396 | 2/1994 | Japan . |
| 7-274176 | 10/1995 | Japan . |
| 7-303046 | 11/1995 | Japan . |
| 8-149474 | 6/1996 | Japan . |

OTHER PUBLICATIONS

Y. Tomita et al., "An error resilient visual communication method using backward channel signaling", Technical Report of IEICE, MVE 96–57, pp. 21–28, Dec. 1996.

Y. Tomita et al., "A study on error resilient visual communication using backward channel signaling", Proceedings of the 1996 IEICE Communication Society Conference, B–867, p.352, 1996.

T. Kimura et al., "A study on amount of frame memories for error resilient visual communication using back–channel signaling", Proceedings of the 1997 IEICE General Conference, B–8–3, p.389, 1997.

(List continued on next page.)

*Primary Examiner*—Bryan Tung
*Attorney, Agent, or Firm*—Pennie & Edmonds LLP

[57] ABSTRACT

A video transmission system and method is provided, by which if the arrival of a signal sent from the video receiving side to the sending side is delayed, or if an error is generated in a signal for communicating a receiving error, it is possible to prevent a situation such that no effective reference picture exists in a (picture) memory. In the present method, storing of encoded data into a memory section is controlled based on information indicated by a signal received from the video receiving side, and the control includes determination whether new data are stored, determination of an area for storing data in the memory section, and deletion of data stored in the memory section. In order to reduce the memory size, it is desirable to delete (i) reference pictures older than a reference picture used for the newest encoded video data which was correctly received, or (ii) a reference picture used for the encoded video data about which a receiving error is communicated from the video receiving side, among reference pictures stored in the memory section.

45 Claims, 27 Drawing Sheets

OTHER PUBLICATIONS

S. Fukunaga et al., "Error resilient video coding by dynamic replacing of reference pictures", Proceedings of GLOBECOM, IEEE, pp. 1503–1508, 1996.

ITU Telecommunication Standardization Sector, Study Group 15, Working Party 15/1, "Error resilient video coding by erroneous backward channel", Expert's Group On Very Low Bitrate Video Telephony,pp. 1–6, LBC–96–087, Apr., 1996.

ITU Telecommunication Standardization Sector, Study Group 15, Working Party 15/1, "An error resilient video coding system using backward channel signaling", Expert's Group On Very Low Bitrate Video Telephony,pp. 1–6, LBC–96–206, Jul., 1996.

ITU Telecommunication Standardization Sector, Study Group 15, Working Party 15/1, "Results of core experiment for error resilient by backward channel toward H.263+", Expert's Group On Very Low Bitrate Video Telephony,pp. 1–4, LBC–96–211, Jul., 1996.

ITU Telecommunication Standardization Sector, Study Group 15, Working Party 15/1, "Specification of core experiment for error resilient by backward channel toward H.263+", Expert's Group On Very Low Bitrate Video Telephony,pp. 1–7, LBC–96–212, Jul., 1996.

ITU Telecommunication Standardization Sector, Study Group 15, Working Party 15/1, "Core experiments on back–channel operation for H.263+", Expert's Group On Very Low Bitrate Video Telephony,pp. 1–16, LBC–96–308, Nov., 1996.

ITU Telecommunication Standardization Sector, Study Group 15, Working Party 15/1, "Stimulation results on NEWPRED under limited amount of reference memories", Expert's Group On Very Low Bitrate Video Telephony,pp. 1–4, LBC–96–309, Nov., 1996.

ITU Telecommunication Standardization Sector,"Draft text proposal of back–channel operation in H.263+",Expert's Group On Very Low Bitrate Video Telephony,pp. 1–5, LBC–96–314,Nov., 1996.

ITU Telecommunication Standardization Sector,"Performance results of NEWPRED on H.263/Annex A",Expert'Group On Very Low Bitrate Video Telephony,pp. 1–4,LBC–96–315,Nov., 1996.

ITU Telecommunication Standardization Sector,"System related issues for H.263/Annex N",Expert's Group On Very Low Bitrate Video Telephony, pp. 1–4, LBC–97–022, Feb., 1997.

ITU Telecommunication Standardization Sector,"Overhead of backward messages for H.263/Annex N",Expert's Group On Very Low Bitrate Video Telephony, pp. 1–8, LBC–97–023, Feb., 1997.

Fukunaga et al., "Error Resilient Video Coding by Dynamic Replacing of Reference Pictures," IEEE Globecom, vol. 3, Nov. 18, 1996, pp. 1503–1508.

☐ : ERROR-FREE PICTURE
▨ : ERRONEOUS PICTURE
▨ : PICTURE REFERRING TO ERRONEOUS PICTURE

⟶ : VIDEO DATA
⟶ : SIGNAL

IMAGE COMMUNICATION SYSTEM AND METHOD

TECHNICAL FIELD

The present invention relates to a video transmission system and method for transmitting video data via a transmission path such as a wireless transmission path or a LAN, in which considerable numbers of transmission errors may occur.

BACKGROUND ART

In common video-coding methods such as MPEG or the like, differences between two successive pictures are generally determined in order to compress the amount of video data information. In such an inter-picture prediction method (called the "inter-picture coding method" hereinbelow), a present picture is predicted according to a previous picture, and a predicted difference is transmitted.

However, when an error is incorporated into a picture passing through a transmission path, thus is rendering the relevant data erroneous, the corresponding picture at the receiving side is also erroneous because the picture is constructed using erroneous data. As a further problem, the next picture is predicted based on the error-containing picture, and the error is propagated to subsequent pictures.

Such a situation in which an error is incorporated into video data occurs when a reading error from a storage medium such as a CD-ROM exists, or a transmission error via a transmission path exists. In particular, significant transmission errors occur if a radio transmission path is used.

As the first conventional example of the video transmission method using such an error-prone transmission path, an intra-picture coding method will be explained, in which if an error is detected at the receiving side, the receiving side informs the video sending side of the situation, and the sending side which received the information encodes video data without using the inter-picture coding method.

FIG. 18 shows an example of a combination system arrangement of the above first conventional example and a general video coding method in which motion compensation and discrete cosine transformation (DCT) are combined.

First, a difference between an input picture and a reference picture is calculated by subtracter 101, and the DCT is performed at DCT section 102. The DCT coefficient as a result of the DCT is quantized by quantizer ("Q") 103 and is temporarily stored in buffer ("buff.") 109. The stored data are read out through control by error controller ("error cont.") 110 and are transmitted through transmission path 120. The signal quantized by quantizer 103 is inverse-quantized by inverse quantizer "$Q^{-1}$" 104 and is then subjected to inverse DCT in inverse DCT section ("IDCT") 105. To the output from section 105, the same reference picture signal as the signal used at the subtracter 101 is added and the added result is stored into picture memory ("PM") 107. Picture-differential controller 108 reads out a reconstructed picture of one picture before and sends it as an reference picture signal to subtracter 101. When the error controller 110 is informed of error detection from the receiving side, the controller 110 interrupts the inputting of a reference picture signal via picture-differential controller 108 into subtracter 101 and switches the coding method to the intra-picture coding.

Whether or not a receiving error exists in the information transmitted through transmission path 120 is determined by error detector 111 at the video receiving side. If no error is detected, the information is inverse-quantized by inverse quantizer ("$Q^{-1}$") 112 and then inverse DCT is performed by inverse DCT section ("IDCT") 113. To the output from section 113, a received picture of one picture before, stored in picture memory ("PM") 115, is added as an reference picture signal by adder 114. The added result is output to a monitor or the like, and is simultaneously stored in PM 115. If a receiving error was detected by the error detector 111, this fact is communicated to the video sending side.

As the second conventional example of the video transmission method using an error-prone transmission path, another method will be explained in which error propagation is prevented by changing a reference picture used for calculating an inter-picture difference at the time of encoding. That is, in this method, if an error is detected in a received picture at the decoding side, the fact that the error was detected, and the relevant picture number (or temporal reference, etc.) or the newest picture number which was correctly received and decoded are communicated to the encoding side, and the reference picture used when the next picture is encoded is changed from the error-detected picture to the picture which was correctly received last.

FIG. 19 shows an example of a combination system arrangement of the above second conventional example and a general video coding method in which motion compensation and the DCT are combined. Here, elements 201–215 and 220 in FIG. 19 respectively correspond to elements 101–115 and 120 in FIG. 18.

Distinctive features of this second example in comparison with the first conventional example are that plural PMs are provided, as shown by reference numerals 207 and 215, and that picture-memory (PM) storing sections 216 and 218 and picture-memory (PM) selectors 217 and 219 are provided.

First, construction and operation of the video sending side will be explained.

First, a difference between an input picture and a reference picture is calculated by subtracter 201, and the DCT is performed at DCT section 202. The DCT coefficient as a result of the DCT is quantized by quantizer 203 and is temporarily stored in buffer 209. The stored data are read out through control by error controller 210 and are transmitted through transmission path 220. On transmission, the error controller 210 also sends the number of the encoded picture and the number of a picture which was used as the reference picture.

The signal quantized by quantizer 203 is inverse-quantized by inverse quantizer 204 and is then subjected to inverse DCT in inverse DCT section 205. To the output from section 205, the same reference picture signal as the signal used at the subtracter 201 is added and the added result is sent to PM storing section 216.

The PM storing section 216 stores the transmitted data (pictures) into PMs 207 in the order PM1→PM2→. . . →PMn→PM1→. . . , and informs PM selector 217 of the number of the picture and information on the PM to which the relevant picture is stored. The PM selector 217 retains the information of the correspondence relationship between each PM and the relevant picture number, which was communicated from the PM storing section 216, and selects one of the PMs (PM1–PMn) 207 according to a signal from error controller 210. The PM selector 217 then reads out the picture stored in the selected PM and sends the contents of the PM as the reference picture signal to subtracter 201.

When error controller 210 is informed of the error detection and the error-containing picture number via transmission path 220 from error detector 211 of the video receiving side, the controller 210 communicates the number of the error-containing picture detected at the video receiving side to PM selector 217. The PM selector 217 reads out a picture of the newest number prior to the communicated number from the relevant PM 207. The selector sends the read-out picture to picture-differential controller 208 and communicates the number of the picture to error controller 210 of the video sending side. The error controller 210 informs the video receiving side of the communicated picture number as the picture number of the reference picture, with the number of the picture being encoded.

If no picture prior to the picture of the number communicated from the error controller 210 is stored in PMs 207, PM selector 217 interrupts the inputting of the reference picture signal via picture-differential controller 208 into subtracter 201, and switches the coding method to intra-picture coding. In addition, error controller 210 ignores the signal indicating the number of an error-containing picture, repeatedly sent from error detector 211 of the receiving side (that is, the signal repeatedly sent until the picture which was encoded using the changed reference picture is received at the video receiving side).

Hereinafter, construction and operations of the video receiving side will be explained.

Whether or not a receiving error exists in the information (or data) transmitted through transmission path 220 is determined by error detector 211. If no error is detected, the information is inverse-quantized by inverse quantizer 212 and then inverse DCT is performed by inverse DCT section 213. On the other hand, error detector 211 informs PM selector 219 of the picture number which was used as the reference picture signal for the present encoded picture and which is communicated from error controller 210. The error detector simultaneously reads out the picture of the communicated picture number from PMs 215 and sends the picture to adder 214. The adder adds the sent reference picture signal to the received signal and outputs a result to a monitor or the like, and also sends the result to PM storing section 218.

The PM storing section 218 performs the same operations as PM storing section 216 of the video sending side, that is, stores the received data (or pictures) into PMs 215 in the order PM1→PM2→. . . →PMn→PM1→. . . , and informs PM selector 219 of the number of the picture and information on the PM to which the relevant picture is stored. The PM selector 219 retains the information of the correspondence relationship between each PM and the relevant picture number, communicated from the PM storing section 218, and selects one of the PM1–PMn according to a signal from error detector 211. The error detector 211 then reads out the picture stored in the selected PM and sends it to adder 214.

When a receiving error is detected, the error detector 211 informs the video sending side of the fact of error detection and the error-containing-picture number or the number of the newest picture which was correctly received and decoded. In addition, the error detector 211 stores and retains the error-containing-picture number and repeatedly informs PM selector 219 of the retained picture number until the detector receives video data which was encoded using data belonging to a picture number prior to the stored picture number as the reference picture, or until it receives intra-picture encoded video data.

FIG. 20 is a diagram for explaining an operational example of the second conventional example, a specific time-series operational example using respective "4" PMs 207 and 215.

In this figure, reference numeral 301 indicates the number of each picture being encoded at the video sending side, and reference numeral 303 shows the picture numbers indicating each content of PMs (PM1–PM4) 207 at the starting time of the encoding of the next picture after the encoding of a picture is completed. Reference numeral 302 indicates the number of each picture under decoding at the video receiving side, and reference numeral 304 similarly shows the picture numbers indicating each content of PMs 215 at the starting time of the decoding of the next picture after the decoding of a picture is completed. In this time-series arrangement, processed picture number 302 at the decoding side is shifted from processed picture number 301 at the encoding side because of a necessary transmission time. Regarding numbers appended to (solid) arrows which indicate video data, "9/8" (as an example) indicates (video) data obtained by encoding the picture of picture number "9" using the picture of picture number "8" as the reference picture. Actually, the amount of video data is very large and thus continuously flows from the sending to the receiving side. However, for the purpose of making the figure clear, only the last part of the video data is indicated by each (solid) arrow.

The present operational example of FIG. 20 shows a case in which data of picture number "10" contain an error. When error detector 211 detects an error, the detector sends a NACK signal (refer to reference numeral 305 in FIG. 20) including the error-containing-picture number and stores the number "10", the error-containing-picture number. This NACK signal (10N) is received by error controller 210 while the video sending side processes the picture of number "12". The error controller 210 controls PM selector 217 in a manner such that the selector selects the number "9", the newest number prior to the error-detected picture number "10", and that the picture of the next number "13" is encoded using the picture of the selected number as the reference picture. Simultaneously, the error controller informs the video receiving side that picture "9" was used as the reference picture (refer to reference numeral 306 in FIG. 20). When error detector 211 receives the signal of this information, the detector directs PM selector 219 to select and read out the picture of number "9" as the reference picture. In addition, error detector 211 repeatedly sends a NACK signal including picture number "10" (10N) with respect to video data of picture numbers 11 and 12, even though those video data themselves include no error because the picture as the reference picture (for them) has a number larger than "10".

In the present operational example, the error is propagated from error-containing picture "10" to picture "11" which uses picture "10" as the reference picture and to picture "12" which uses picture "11" as the reference picture, but is not propagated to picture "13" which uses the changed reference picture. In this way, this second conventional example has an advantage in that even if an error occurs, propagation of the error can be prevented without switching the coding method to the intra-picture coding.

In the above first conventional example, by performing the intra-picture coding, the amount of data necessary for transmitting a picture is remarkably increased in comparison with a no-error case, which causes a problem in that the number of transmitted pictures is decreased and the quality of decoded pictures is degraded because the quantization step size is increased. In addition, because of the large amount of data, there is a high probability that intra-picture encoded data will again include an error; thus, a vicious circle occurs in which intra-picture encoding must be repeatedly performed.

In the above second conventional example, if the arrival of the NACK signal sent from the video receiving side to the video sending side is delayed due to any problem, it takes substantial time for the video sending side to change the reference picture, whereby there occurs a problem in that an appropriate reference picture no longer exists in the PMs when the change of reference picture is performed. Such a problem occurs when (i) an error enters into the NACK signal during its transmission and the video sending side cannot recognize the signal, (ii) a time necessary for transmission is long, (iii) the transmission time includes fluctuation, and (iv) the amount of each encoded data is not fixed. In such situations, only the intra-picture coding method can block error propagation, even in the second conventional example; thus, problems similar to the first conventional example also occur in the second example.

FIG. 21 is a diagram for showing an operational example having the same conditions as the example shown in FIG. 20, in which an error was generated in a signal sent from the video receiving side to the video sending side, and thus the sending side could not recognize the sent signal.

In this operational example, reference numeral 401 indicates the number of each picture being encoded at the video sending side, and reference numeral 403 shows the picture numbers indicating each content of PMs 207 at the starting time of the encoding of the next picture after the encoding of a picture is completed. Reference numeral 402 indicates the number of each picture under decoding at the video receiving side, and reference numeral 404 similarly shows the picture numbers indicating each content of PMs 215 at the starting time of the decoding of the next picture after the decoding of a picture is completed. In this time-series arrangement, processed picture number 402 at the decoding side is shifted from processed picture number 401 at the encoding side because of a necessary transmission time.

The present operational example shows a case in which data of picture number "10" contain an error, as in the example shown in FIG. 20. When error detector 211 detects an error, the detector sends a NACK signal including the error-containing-picture number (refer to reference numeral 405 in FIG. 21). Here, an error occurred in this NACK signal and error controller 210 could not recognize the erroneous signal; thus, the video sending side encodes the picture of picture number "13" using the picture of number "12" as the reference picture. The video receiving side next receives data of picture number "11" which was encoded using the error-containing picture of number "10" as the reference picture; thus, a NACK signal including picture number "10" is sent (refer to reference numeral 406 in FIG. 21). When this NACK signal (10N) is received by error controller 210 while the sending side processes the picture of number "13", the error controller 210 controls PM selector 217 to select a number which is the newest prior to the error-detected picture number "10" so as to encode the picture of number "14". However, at this point, no picture prior to number "10" exists in PMs 207. Therefore, the picture of number "14" must be encoded using the intra-picture coding method (refer to reference numeral 407 in FIG. 21).

Next, FIG. 22 is a diagram for showing an operational example having the same conditions as the example shown in FIG. 20, in which the necessary transmission time is long.

As in the case as shown in FIG. 20, an error is generated in video data of picture number "10" and the NACK signal (10N) communicating the situation is received by error controller 210. Here, the arrival of this NACK signal is delayed (refer to reference numeral 505 in FIG. 22); thus, the picture next decoded at the video sending side is transferred to picture number "15" and at the time of encoding of the picture "15", no picture prior to picture number "10" exists in PMs 207. Therefore, the picture of number "15" must be encoded using the intra-picture coding method.

DISCLOSURE OF INVENTION

In consideration of the above problems, the present invention has as an object to solve the problem of the second conventional example, that is, to provide a video transmission system and method for realizing a desirable situation such that if an error is generated in a signal for communicating a receiving error, sent from the video receiving side to the video sending side, or if the arrival of a signal sent from the video receiving side to the video sending side is delayed, it is possible to prevent a situation such that no picture used for the switching of the reference picture exists in PM(s), by which (i) degradation of video quality due to the switching of the coding method to the intra-picture coding, and (ii) data increase, also due to the switching of the coding method to the intra-picture coding, leading to re-generating an error and repeating the intra-picture coding, can be prevented.

To realize the above object, the present invention provides a video transmission system comprising, in the video sending side:

an encoding section for encoding an input picture by an inter-picture coding method of compressing data using inter-picture differences, and outputting encoded video data;

a signal receiving section for receiving a signal from the video receiving side, the signal indicating presence or absence of an error relating to the encoded video data received at the video receiving side and a picture number of the encoded video data;

a memory section having buffers for maintaining the encoded video data output from the encoding section as reference pictures used for the encoding based on the inter-picture coding method;

a reference picture determining section for selecting a reference picture used in the encoding section among pictures stored in the memory section if at least one picture is stored in the memory section, based on information indicated by the signal received by the signal receiving section;

a reference picture communicating section for communicating a picture number of the reference picture used in the encoding section to the video receiving side; and a picture number communicating section for communicating a picture number of the encoded video data output from the encoding section; and in the video receiving side:

an encoded data receiving section for receiving the encoded video data output from the encoding section of the video sending side, and detecting and outputting presence or absence of an error relating to the video data;

a picture number receiving section for receiving the picture number of the encoded video data communicated from the picture number communicating section of the video sending side;

a signal sending section for sending the video sending side a signal which indicates the picture number of the encoded video data received by the picture number receiving section and the presence or absence of an error with respect to the relevant video data which was detected by the encoded data receiving section;

a decoding section for decoding the encoded video data received by the encoded data receiving section and outputting decoded video data;

a memory section having buffers for maintaining the decoded video data output from the decoding section as reference pictures used for the decoding;

a reference picture number receiving section for receiving the picture number of the reference picture used at the time of encoding, communicated from the reference picture communicating section of the video sending side; and a reference picture determining section for selecting a reference picture used in the decoding section among pictures stored in the memory section if at least one picture is stored in the memory section, according to the picture number of the reference picture received by the reference picture number receiving section;

the system further comprising:

memory changing means for performing control of data storage of the encoded video data output from the encoding section into the memory section based on information indicated by the signal received by the signal receiving section of the video sending side, the control including determination whether new data are stored, determination of an area for storing data in the memory section, and deletion of data stored in the memory section.

The present invention also provides a video transmission method comprising the steps of, regarding the video sending side:

encoding an input picture by an inter-picture coding method of compressing data using inter-picture differences, and outputting encoded video data;

receiving a signal from the video receiving side, the signal indicating presence or absence of an error relating to the encoded video data received at the video receiving side and a picture number of the encoded video data;

selecting a reference picture used at the time of encoding among pictures stored in a memory section, which has buffers for maintaining the output encoded video data as reference pictures used for the encoding based on the inter-picture coding method, if at least one picture is stored in the memory section, based on information indicated by the signal received from the video receiving side;

communicating a picture number of the reference picture used at the time of encoding to the video receiving side; and communicating a picture number of the output encoded video data; and regarding the video receiving side:

receiving the encoded video data output from the video sending side, and detecting and outputting presence or absence of an error relating to the video data;

receiving the picture number of the encoded video data communicated from the video sending side;

sending the video sending side a signal which indicates the picture number of the received encoded video data and the detected presence or absence of an error with respect to the relevant video data;

decoding the received encoded video data and outputting decoded video data;

receiving the picture number of the reference picture used at the time of encoding, communicated from the video sending side; and selecting a reference picture used at the time of decoding among pictures stored in a memory section, which has buffers for maintaining the output decoded video data as reference pictures used for the decoding, if at least one picture is stored in the memory section, according to the received picture number of the reference picture; the method further comprising the step of:

performing control of data storage of the output encoded video data into the memory section based on information indicated by the signal received by the video sending side, the control including determination whether new data are stored, determination of an area for storing data in the memory section, and deletion of data stored in the memory section.

According to the above system and method, one newest reference picture, which was correctly received at the video receiving side, is always stored in the memory section of the sending side; thus, it is possible to prevent a situation in which no correct reference picture exists when a receiving error is communicated from the video receiving side. Therefore, even in a case in which the use of the intra-picture coding method is unavoidable because no reference picture is in the memory section, observed in the conventional technique in which error propagation is prevented while the inter-picture coding method is performed, the newest reference picture which was correctly received can be maintained in the memory section of the same size as in the conventional case; thus, degradation of video quality can be prevented.

Additionally, in order to reduce a buffer area (or the number of PMs) in the memory section, it is desirable to delete (i) reference pictures older than a reference picture used for the newest encoded video data which was correctly received, or (ii) a reference picture used for the encoded video data about which a receiving error is communicated from the video receiving side, among reference pictures stored in the memory section, according to the control of data storage performed by the memory changing means.

Regarding a unit for processing the input picture, a picture is representative in the present invention; however, a small area of a picture as a constituent of the picture, and a cluster of pixels which organizes the small area, may also be used.

Hereinbelow, applied embodiments relating to the present invention will be explained.

Timer means may be provided in the video sending side, which judges whether the signal receiving section received the signal from the video receiving side within a predetermined time, and informs the memory changing section of a result of the determination if it is determined that the signal receiving section did not receive the signal. In this case, according to the control of data storage performed by the memory changing means, even if a signal (especially, a signal communicating a receiving error) from the video receiving side is not received at the video sending side due to an error, or if signal receiving at the video sending side is delayed due to increase of the amount of transmission delay, processing delay of the receiving side, or the like, the reference picture can be promptly changed; thus, recovery from error-containing pictures can be advanced at the video receiving side.

Picture counting means may be provided in the video sending side, which judges whether the signal receiving section received the signal from the video receiving side while the encoding section has encoded a predetermined number of pictures, and informs the memory changing section of a result of the determination if it is determined that the signal receiving section did not receive the signal. In this case, according to the control of data storage performed by the memory changing means, even if the amount of video data of each encoded picture varies and a signal (especially, a signal communicating a receiving error) from the video receiving side is not received at the video sending side due to an error, or if signal receiving at the video sending side is delayed due to increase of the amount of transmission delay, processing delay of the receiving side, or the like, the reference picture can be promptly changed; thus, recovery from error-containing pictures can be advanced at the video receiving side.

Storage situation communicating means may be provided in the video sending side, which monitors the content of the memory section of the sending side, and informs the encoding section if no reference picture usable for the inter-picture coding method exists in the memory section. In this case, if the encoding section is informed by the storage situation communicating means, the encoding section encodes the next picture using an intra-picture coding method. In this way, it is possible to avoid an unanticipated case in which the encoding section tries to inter-picture-encode an input picture when no reference picture exists.

If the encoding section uses both the inter-picture coding method and an intra-picture coding method, and performs each encoding operation using any one of the methods, encoding situation communicating means may be provide in video sending side, which informs the memory changing means of a situation in which the intra-picture coding method was performed by the encoding section if the encoding section did so. In this case, according to the control of data storage performed by the memory changing means, when the intra-picture coding is performed, it is possible, in consideration of the effect of preventing error propagation in accordance with this coding method, to change the memory to contents by which next encoding is more suitably performed, for example, by deleting unnecessary data stored in the memory.

Storage situation communicating means may be provided in the video receiving side, which communicates information on the pictures stored in the memory section of the receiving side to the video sending side, while storage situation receiving means may be provided in the video sending side, which receives the information on the pictures communicated by the storage situation communicating means, and further communicates the received information to the reference picture determining section of the sending side. In this case, the reference picture determining section of the video sending side selects the reference picture based on the information indicated by the signal received by the signal receiving section and the information communicated by the storage situation receiving means. In this way, it is possible to prevent the reference picture determining section of the video sending side from selecting a picture which does not exist in the memory section of the video receiving side as the reference picture.

Switching means may be provided in the video receiving side, which receives information on the presence or absence of an error, detected by the encoded data receiving section, and which controls in a manner such that if an error is present, the output from the decoding section is not sent to the memory section of the receiving side, while if an error is absent, the output from the decoding section is sent to said memory section. In this way, it is possible to realize a more convenient system for users, in which an error-containing picture is intentionally used while only error-free video data are stored in the memory of the system.

The effects obtained by the applied embodiments can also be obtained by performing a method which corresponds to the operation of each embodiment. Furthermore, the present invention also provides a sending apparatus comprising each constitutional element of the video sending side in the above system, a receiving apparatus comprising each constitutional element of the video receiving side also in the above system, methods corresponding to each apparatus, and storage media storing computer programs for making a computer execute each method described above.

MODES FOR CARRYING OUT THE INVENTION

Hereinbelow, embodiments of the present invention will be explained in detail with reference to the drawings.

Figure 1:
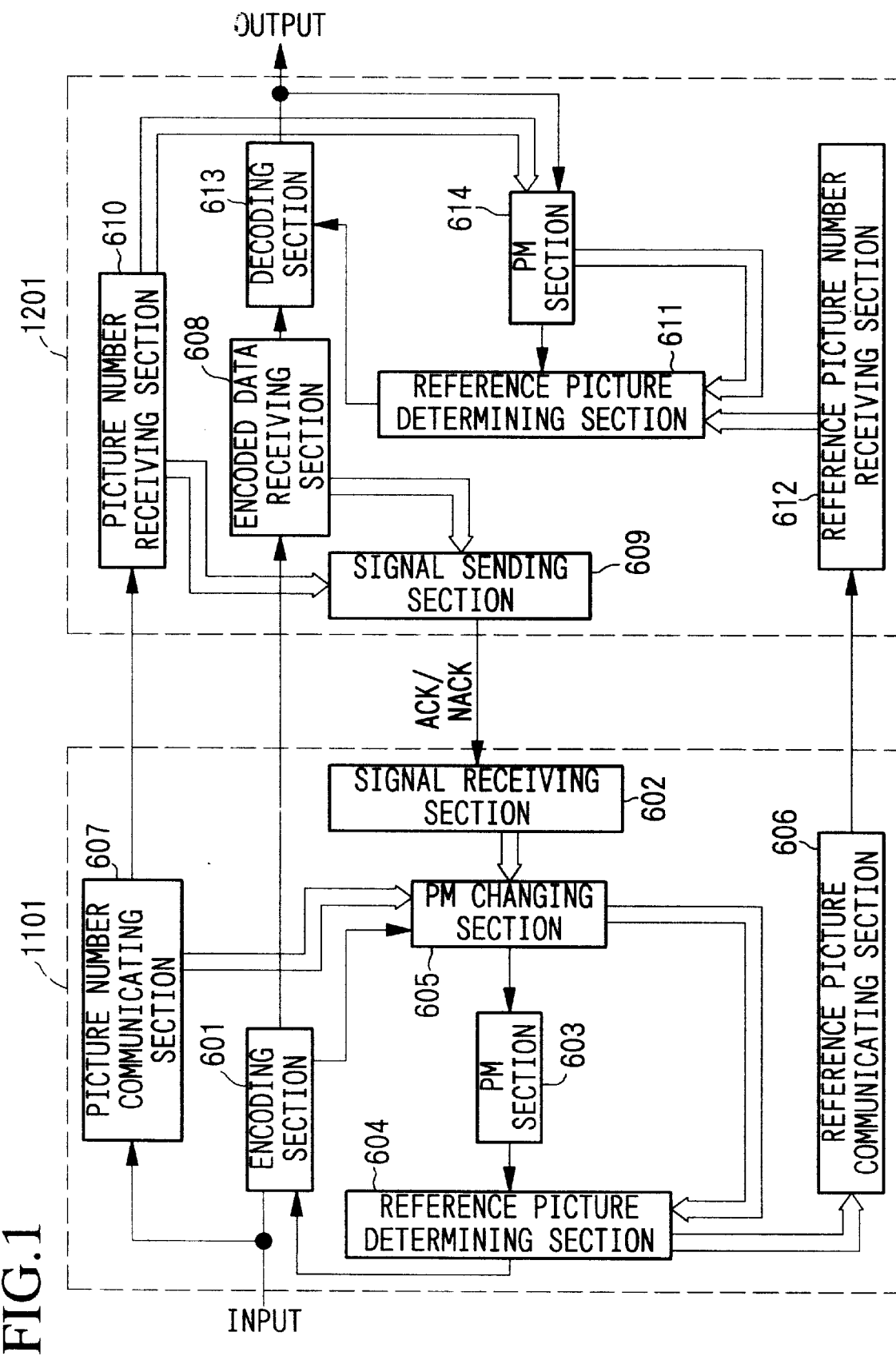
FIG. 1 is a block diagram showing a general configuration of the first embodiment according to the present invention.

FIG. 1 is a block diagram showing a general configuration of the first embodiment according to the present invention.

First, configuration and operations of video sending side 1101 will be explained.

Video data input from a camera or the like are encoded by encoding section 601 which performs the video encoding method and compresses data using inter-picture differences, and is sent from the section 601 to PM (picture memory) changing section 605.

According to a signal sent from signal receiving section 602 which receives an ACK or NACK signal from the video receiving side explained later, PM changing section 605 determines (i) to store or not to store data for a reference picture into PM (picture memory) section 603, (ii) if the data is stored, into which of plural storage buffers (i.e., PMs) the data should be stored, and (iii) if data is deleted, which buffer or whether the whole of the PM should be deleted. In addition, the PM changing section 605 makes correspondence between each picture number (or temporal reference, etc.) communicated from picture number communicating section 607 and the data for the reference picture (which was stored) from encoding section 601. An example of the actual method for the above determination will be explained later.

Reference picture determining section 604 selects a reference picture for a picture next-encoded according to a signal from PM changing section 605, and reads out data from PM section 603 and sends them to encoding section 601. An example of the actual method for the above determination will be explained later. In addition, the reference picture determining section 604 informs the video receiving side via reference picture communicating section 606 of the number of the reference picture which was used for encoding. Furthermore, the number of the picture encoded is communicated via picture number communicating section 607 to the video receiving side.

Next, configuration and operations of video receiving side 1201 will be explained.

Encoded data receiving section 608 receives encoded data from the video sending side, and determines presence or absence of an error(s) in the received encoded data. If an error is detected, the receiving section 608 informs signal sending section 609 of the result of detection. The signal sending section 609 reads out the number of the error-containing picture from picture number receiving section 610 which receives each picture number communicated from picture number communicating section 607 of the video sending side. The signal sending section 609 then sends a NACK signal, which indicates that an error was detected, with the relevant picture number to the video sending side.

If no error was detected, encoded data receiving section 608 communicates the result to signal sending section 609. The signal sending section 609 reads out the relevant picture number from picture number receiving section 610 and sends an ACK signal, which indicates that no error was detected, with the read-out picture number, to the video sending side. In other cases, the receiving section 608 informs the video sending side that the erroneous situation is continuing.

The encoded data received by encoded data receiving section 608 are decoded by decoding section 613. If the data can be decoded without an error, reference picture determining section 611 detects the number of the reference picture used for the encoded data, which is communicated via reference picture number receiving section 612 from reference picture communicating section 606 of the video sending side. The determining section 611 then reads out data corresponding to the detected number from PM section 614 and sends the data to decoding section 613.

The decoding section 613 correctly decodes the video data and outputs the decoded data to a monitor or the like, and simultaneously stores them into PM section 614. If video data with no error could not be obtained, the output to a monitor or the like, and the storage into the PM section 614 are not performed. PM section 614 reads out a fame number from the picture number receiving section and makes correspondence between the number and the decoded picture stored by the decoding section. Here, PM section 614 informs reference picture determining section 611 of the number of the newly-stored picture and the storage position thereof (in the memory).

Figure 19:
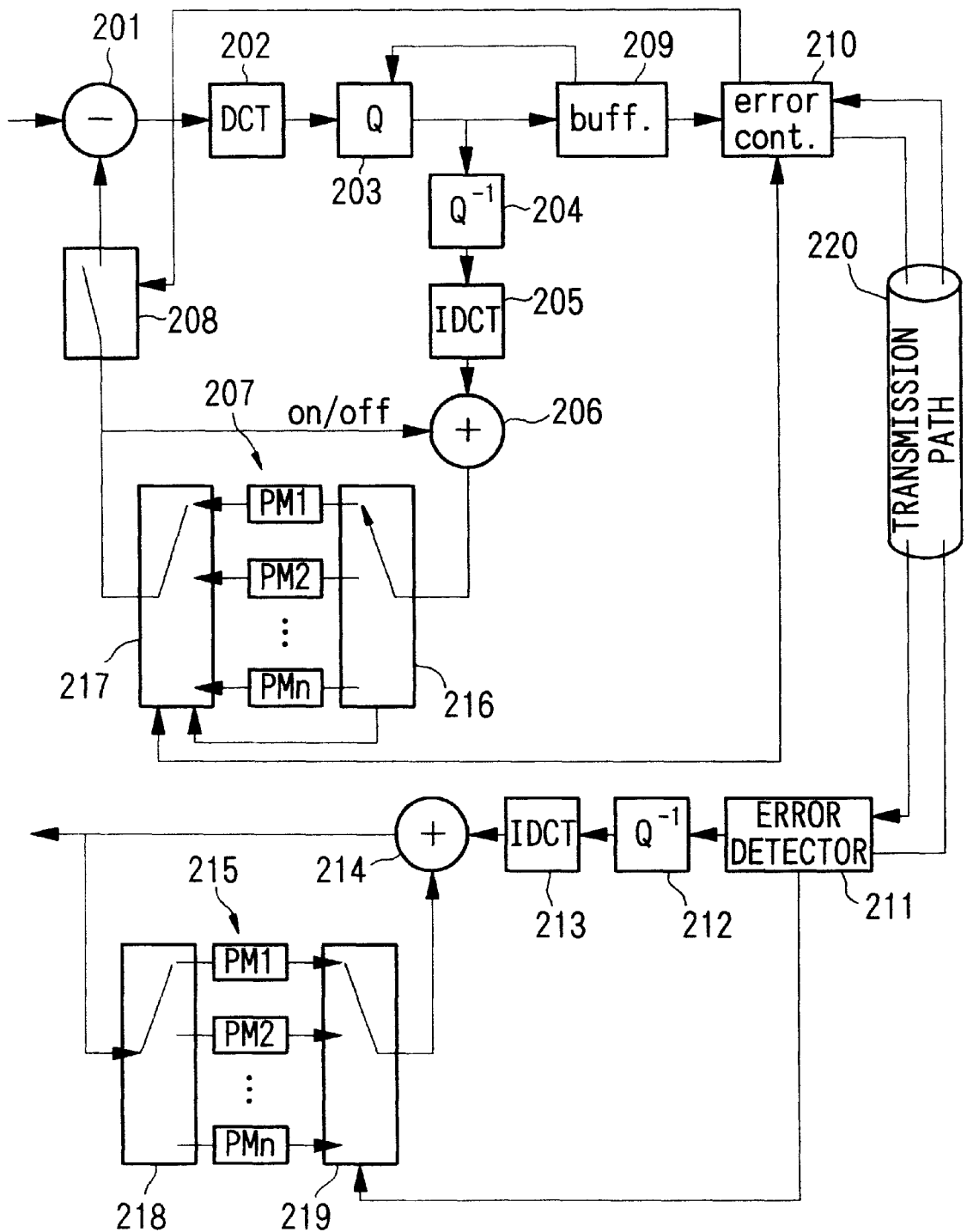
FIG. 19 is a block diagram showing a combination system arrangement of the second conventional example and a general video coding method.

Details of each part in the present embodiment are similar to the configuration of FIG. 19 used for explaining the second conventional example, except for PM changing section 605 in the video sending side. Here, operations of the parts corresponding to error controller 210 and error detector 211 in FIG. 19 are different from the second conventional example.

In the explained second conventional example, the error detector 211 informs error controller 210 of the result of error detection only when an error is detected. However, in the present embodiment, encoded data receiving section 608 at the video receiving side sends the receiving section 602 of the video sending side an ACK signal including a picture number correctly received, also in error-free cases. Similarly, error controller 210 informs PM selector 219 only when an error situation is reported from error detector 211; however, the signal receiving section 602 according to the present invention informs PM changing section 605 also when it is reported that data was received without an error.

Hereinbelow, operations of PM changing section 605, a distinctive section of the present invention, will be explained in further detail.

Figure 2:
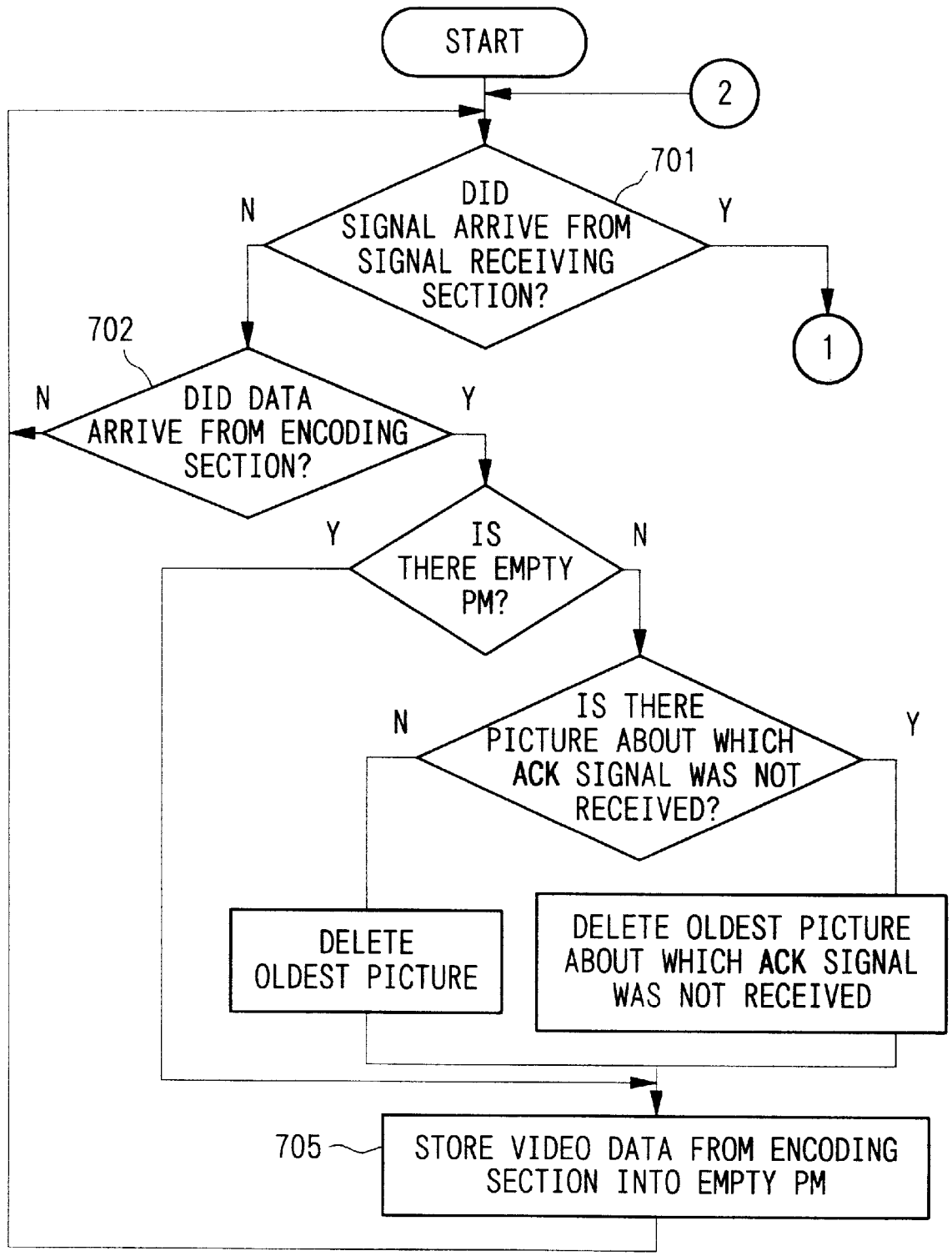
FIG. 2 is a (first) flowchart showing the operational flow of the PM changing section in FIG. 1.
Figure 3:
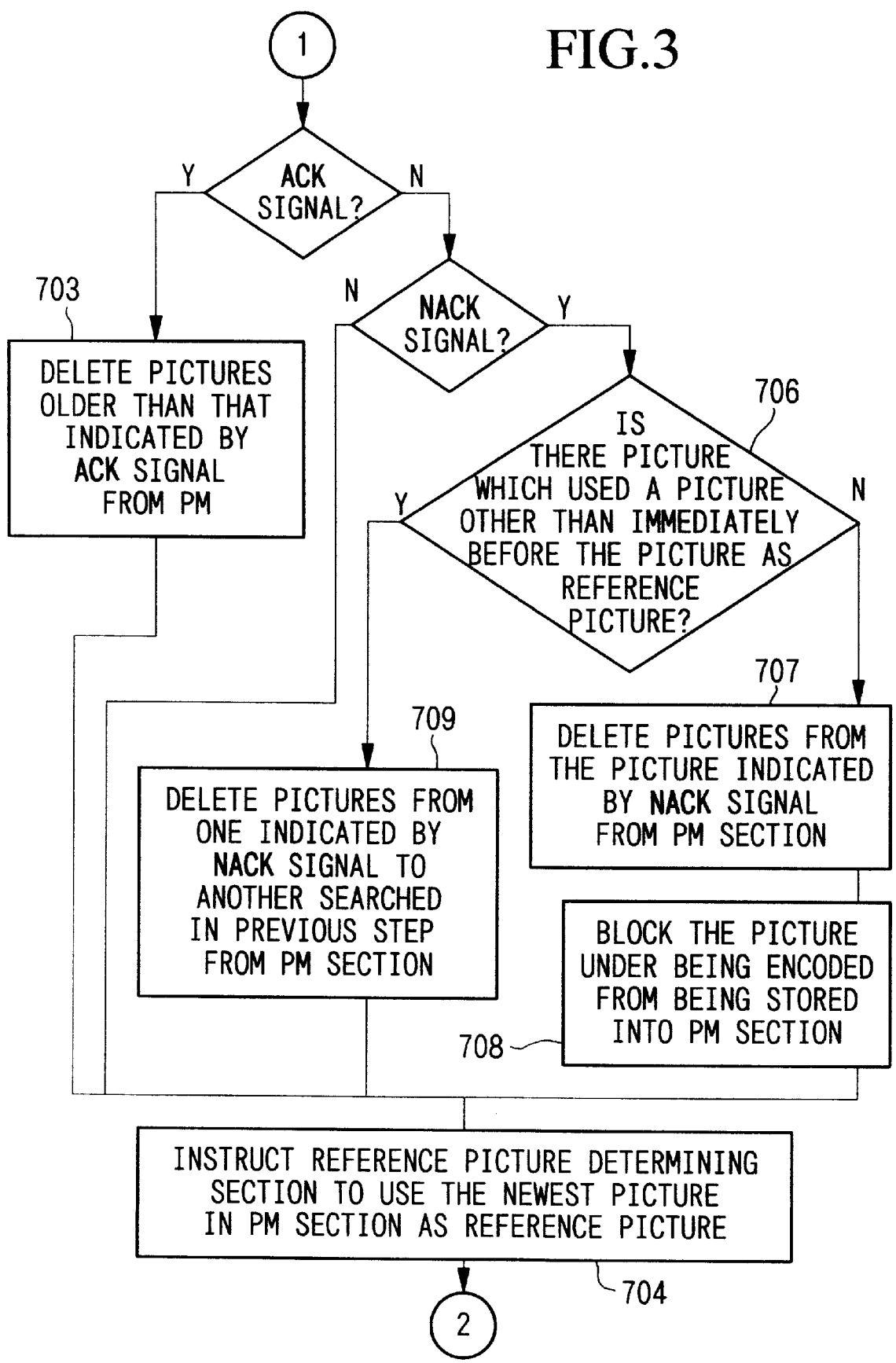
FIG. 3 is a (second) flowchart showing the operational flow of the PM changing section in FIG. 1.

FIGS. 2 and 3 are flowcharts showing the operational flow of PM changing section 605. The PM changing section 605 monitors inputs from signal receiving section 602 and encoding section 601 (see steps 701 and 702), and is operated according to each input. Actual operations will be explained below with examples of system operations. Here, "①" in FIG. 2 indicates that this position continues to position "①" in the flow of FIG. 3 while "③" in FIG. 3 indicates that this position continues to position "②" in the flow of FIG. 2.

Figure 4:
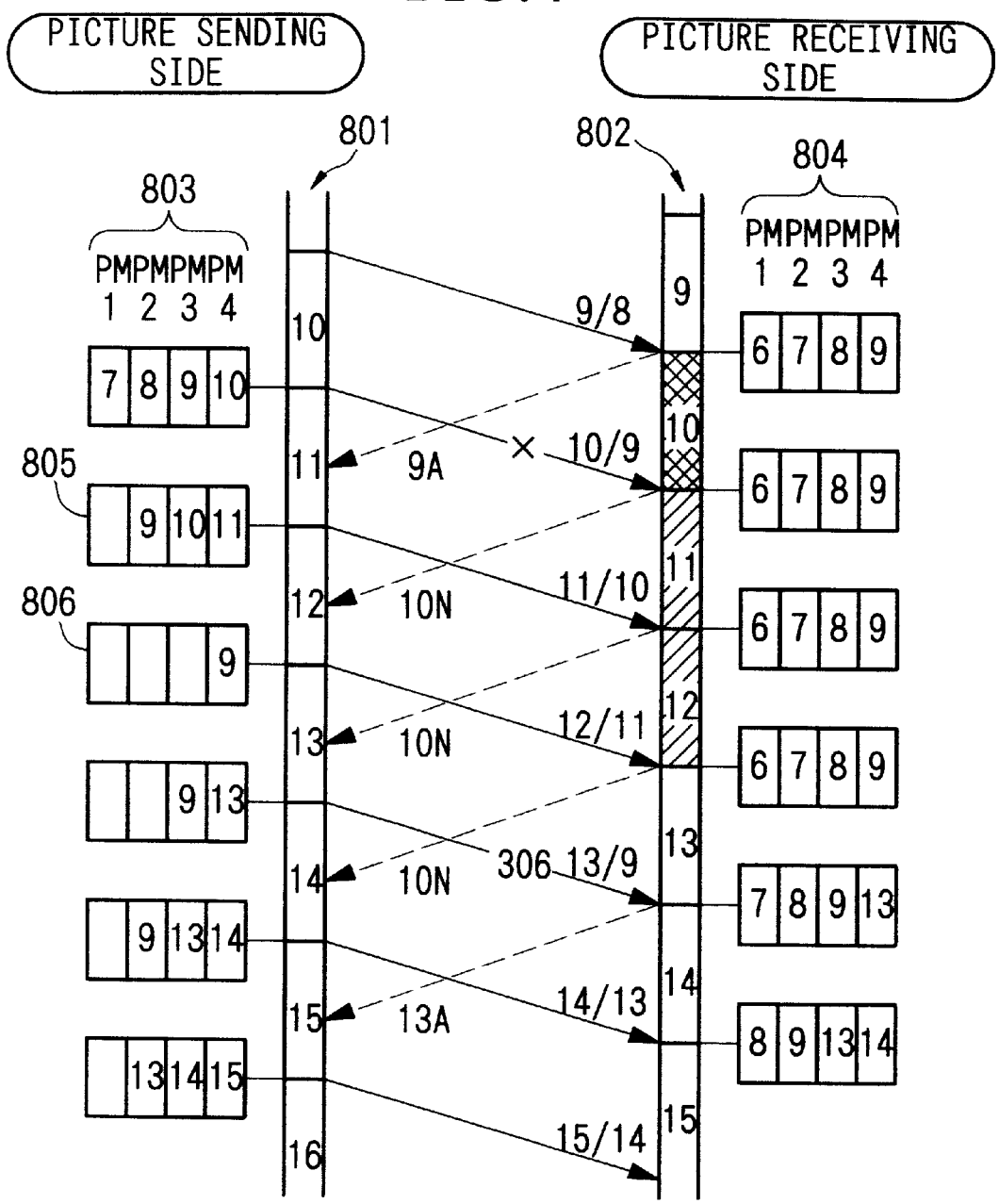
FIG. 4 is a diagram for explaining an operational example of the first embodiment.

FIG. 4 is a diagram for showing a time-series operational example of the present embodiment. The form of the diagram and the meaning of each reference numeral are similarly defined to those used in FIG. 20, and this diagram shows a specific time-series operational example using respective "4" PMs 603 and 614.

Reference numeral 801 indicates the number of each picture being encoded at the video sending side, and reference numeral 803 shows the picture numbers indicating each content of reference buffers of PM section 603 (PM1–PM4) at the starting time of the encoding of the next picture after the encoding of a picture is completed. Reference numeral 802 indicates the number of each picture under decoding at the video receiving side, and reference numeral 804 similarly shows the picture numbers indicating each content of reference buffers of PM section 614 (PM1–PM4) at the starting time of the decoding of the next picture after the decoding of a picture is completed. In this time-series arrangement, processed picture number 802 at the decoding side is shifted from processed picture number 801 at the encoding side because of a necessary transmission time.

Figure 20:
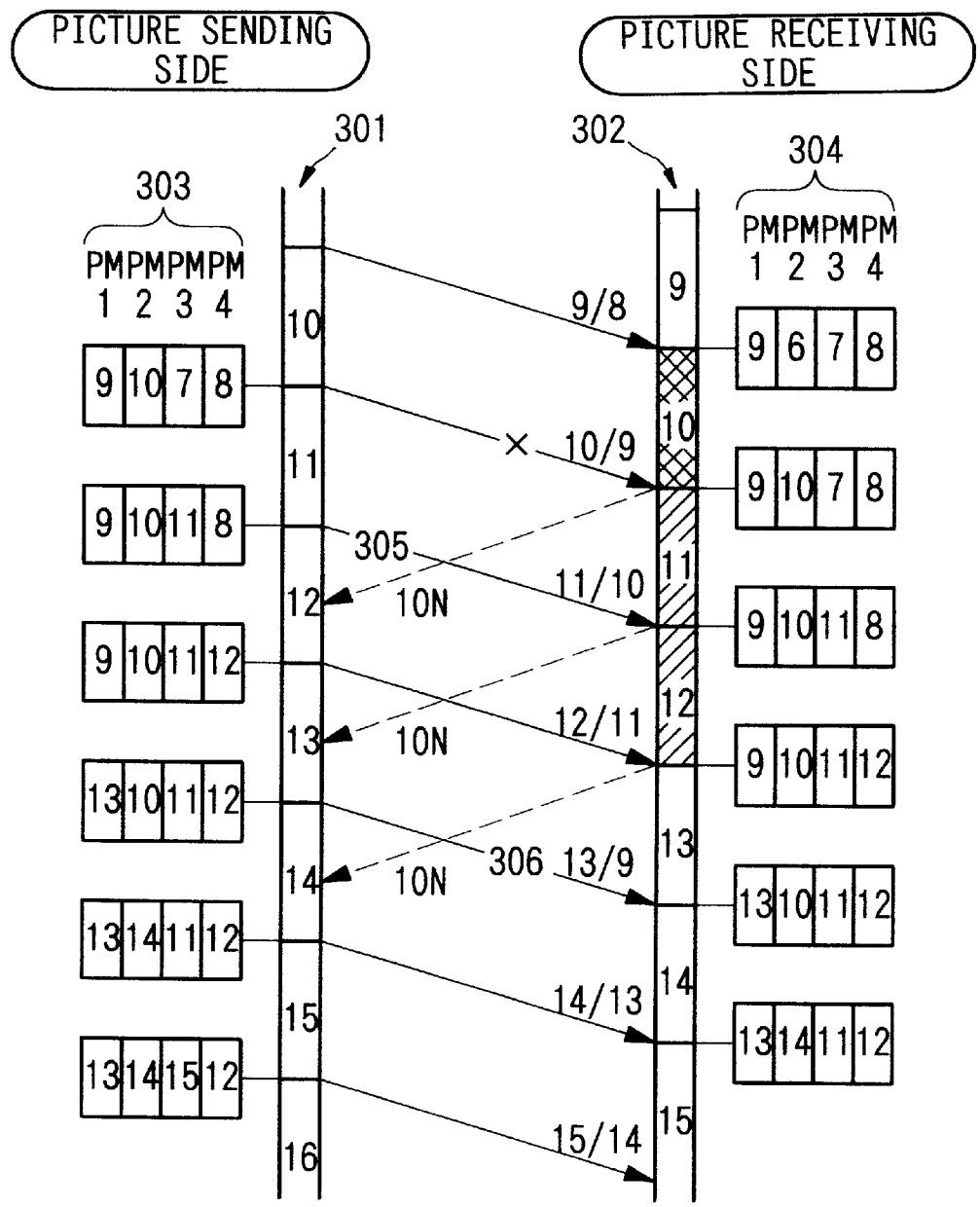
FIG. 20 is a diagram for explaining an operational example of the second conventional example.
Figure 21:
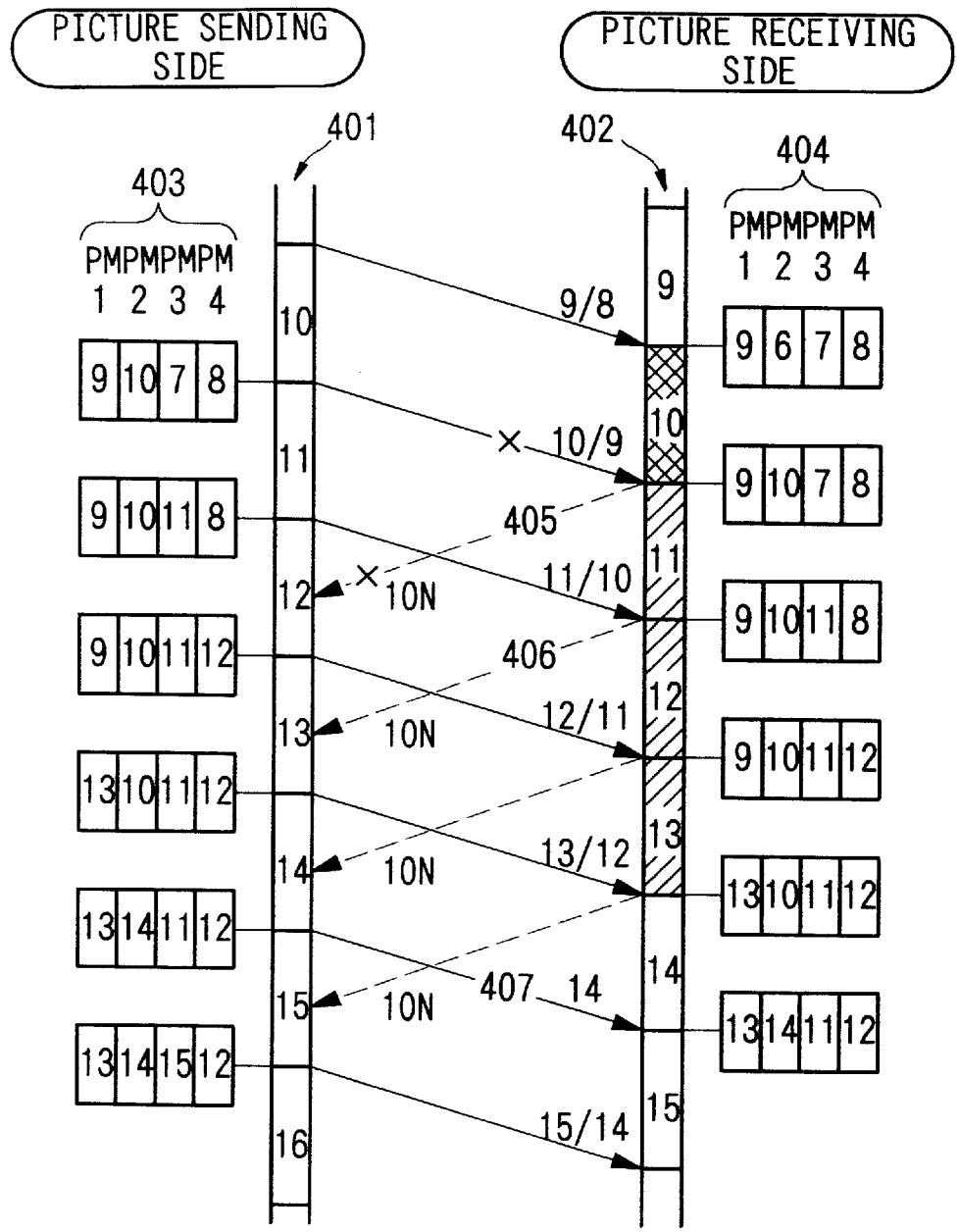
FIG. 21 is a diagram for explaining another operational example of the second conventional example.
Figure 22:
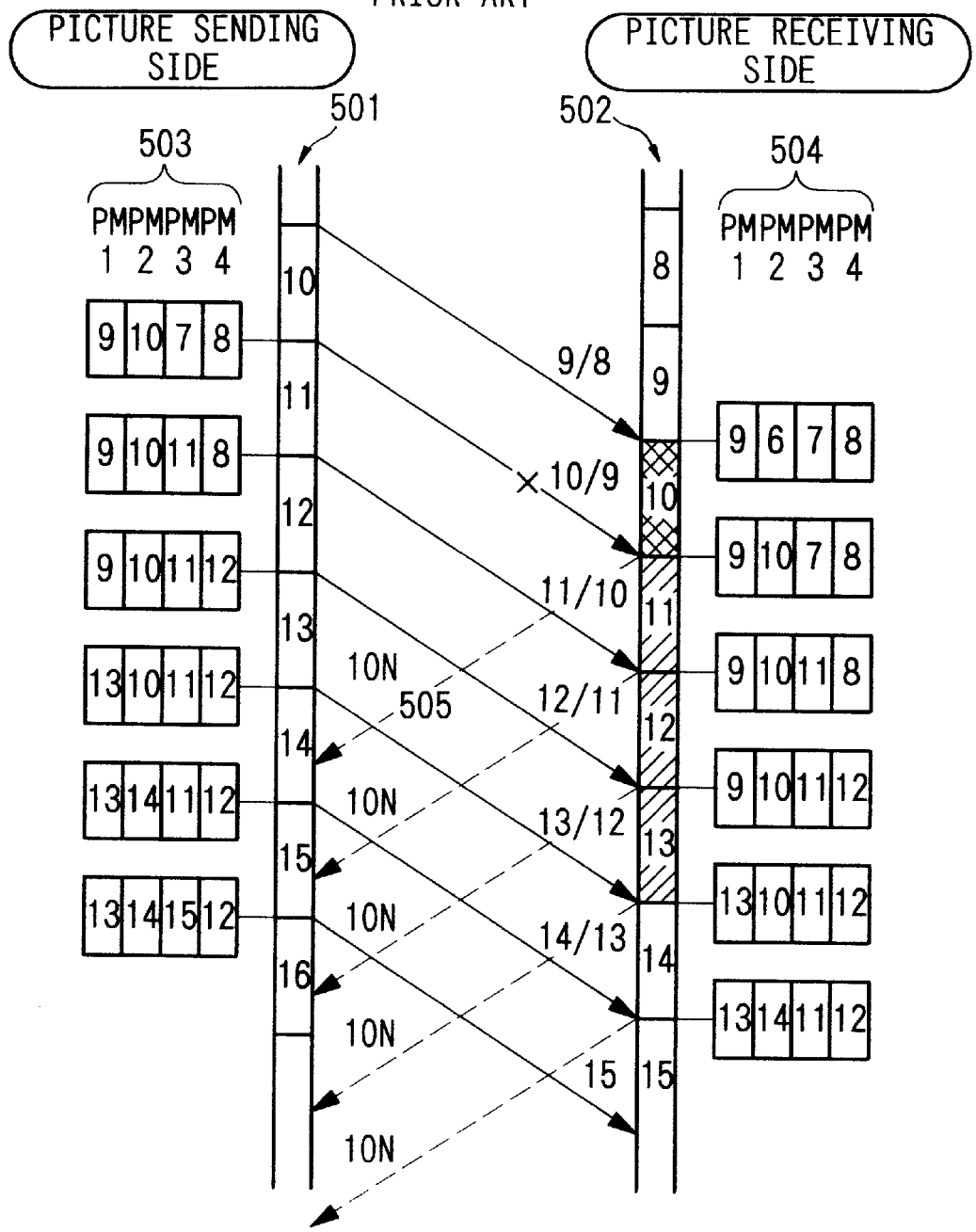
FIG. 22 is a diagram for explaining another operational example of the second conventional example.

Regarding numbers appended to (solid) arrows which indicate video data, "9/8" (as an example) indicates (video) data obtained by encoding the picture of picture number "9" using the picture of picture number "8" as the reference picture. In order to clearly indicate the newest picture in the notation relating to reference buffers, a stack-type memory management system such that the newest picture exists in PM4 is assumed, not using an system such that an older picture is overwritten as shown in FIG. 20.

The signal receiving section 602 of the video sending side, which received an ACK signal including picture number "9" (see 9A) from the video receiving side, informs the PM changing section 605 of the signal. According to the process shown by step 703 in FIG. 3, the PM changing section 605 deletes pictures of older numbers "7" and "8" than number "9" from PM section 603. In this way, the contents of PM section 603 is changed to be pictures of numbers "9" and "10". Next, according to the process shown by step 704 in FIG. 3, the PM changing section 605 instructs reference picture determining section 604 to use the newest picture in PM section 603 as the reference picture.

When encoding of the picture of number "11" is completed, video data of picture "11" is sent from encoding section 601 to PM changing section 605. According to the process shown by step 705 in FIG. 2, the PM changing section 605 stores video data of picture "11" into PM section 603. After that, encoding of the picture of number "12" is started by the encoding section, where the contents of PM section 603 are "9, 10, and 11" as shown by reference numeral 805 in FIG. 4. In addition, reference picture determining section 604, which was directed to use the newest picture in PM section 603 as the reference picture, operates such that picture "11", the newest picture at this point, is used as the reference picture for encoding of picture "12".

Next, it is assumed that a NACK signal (10N) is received with respect to the picture of number "10" during encoding of the picture of number "12". Signal receiving section 602 informs the PM changing section 605 of this situation. According to the process shown by step 706 in FIG. 3, the PM changing section 605 searches for a picture which used a picture other than immediately before said picture as the reference picture. However, every picture of numbers 9, 10, and 11 in the PM section uses a picture immediately before itself as the reference picture; thus, according to the process of step 707, the PM changing section deletes pictures "10" and "11", that is, the pictures from number "10" indicated by the NACK signal, from the PM section.

In addition, according to the process shown by step 708, the picture of number "12" being encoded is not stored in PM section 603. When the encoding of the picture "12" is completed, the contents of the PM section is only "9" as shown by reference numeral 806. The encoding of picture "13" is next started, where picture "9", the only and newest picture in the PM section, is used as the reference picture according to the process shown by step 704.

Next, signal receiving section 602, which received again a NACK signal with respect to picture "10" (10N) during encoding of picture "13", informs the PM changing section 605 of the receipt. According to the process shown by step 706 in FIG. 3, the PM changing section 605 searches for a picture which used a picture other than immediately before said picture as the reference picture. In the present situation, picture "13" uses picture "9", which is a picture other than immediately before the picture 13", as the reference picture; thus, according to the processes shown by steps 709 (in the present operational example, no relevant picture to be deleted exists) and 704 in FIG. 3, picture "14" is encoded using picture "13" as the reference picture.

Similar operations are performed if a NACK signal with respect to picture "10" (10N) is received during encoding of the next picture "14".

Lastly, signal receiving section 602, which received an ACK signal with respect to picture "13" (13A) during encoding of picture "15", informs the PM changing section 605 of the signal. According to the process shown by step 703, the PM changing section 605 deletes the picture of number "9", an older number than picture number "13" indicated by the ACK signal, from the PM section. According to step 704, the encoding of picture "16" is performed using picture "15" as the reference picture.

Figure 5:
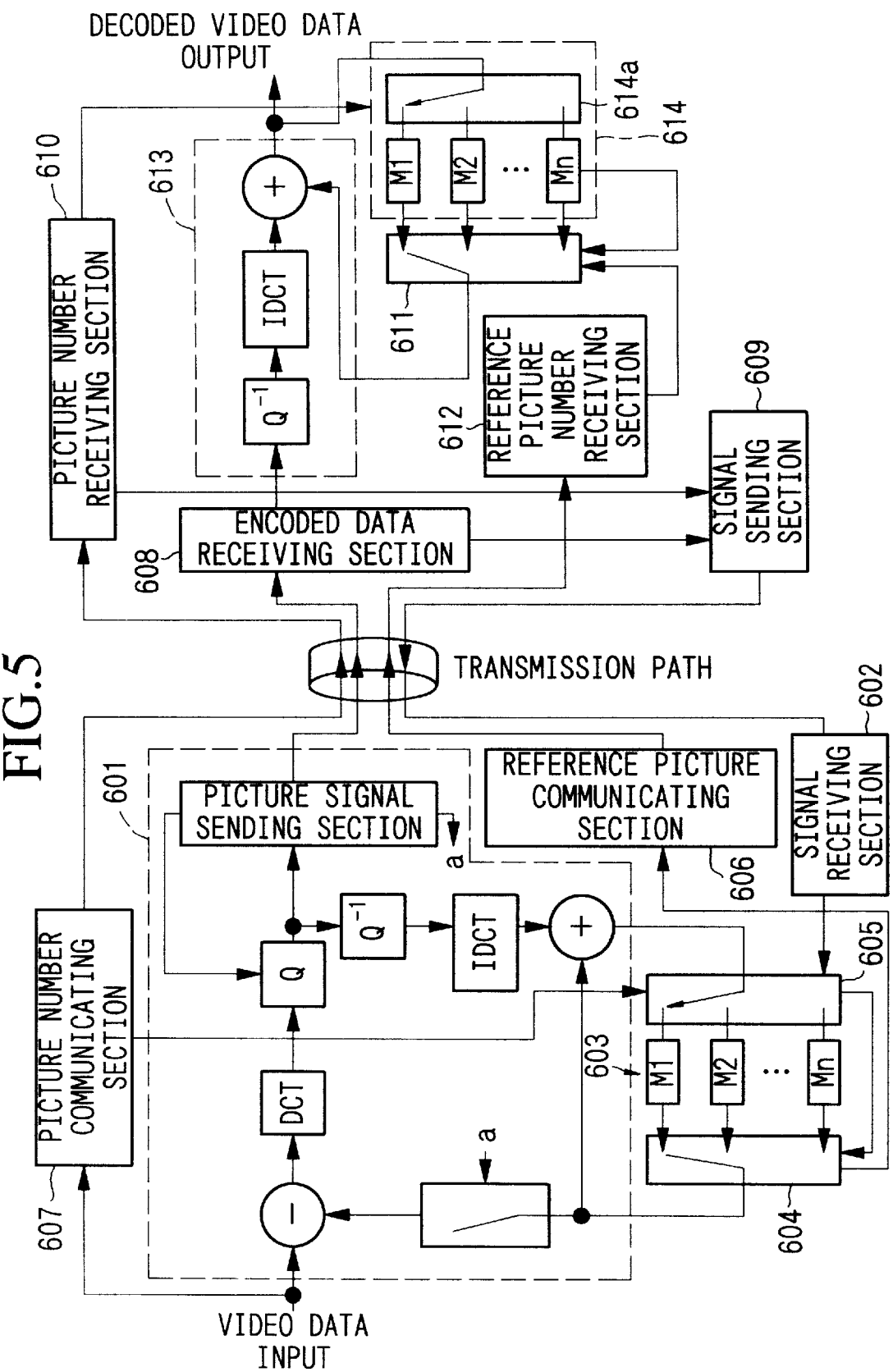
FIG. 5 is a block diagram showing a variation example of a combination system arrangement of the first embodiment and a general video coding method.

FIG. 5 shows a variation example of a combination system arrangement of the above embodiment and a general video coding method in which motion compensation and discrete cosine transformation (DCT) are combined.

In the above-mentioned embodiment, video data (i.e., pictures) are exemplarily processed for each picture; however, the unit for processing video data is not limited to be a picture but is instead a GOB (Group of Blocks: a small area of a picture as a constituent of the picture) or MB (Macro Block: a unit for a cluster of pixels (Cr, Cb, Y), which organizes the GOB) may also be possible.

Accordingly, in this variation, regarding each term in FIG. 1, the term "picture number" may be replaced with the term "picture (video data) number", a memory consisting of plural picture memories (M1, M2, . . . Mn) is adopted in place of "picture memory (PM)", and "PM changing section" is replaced with "memory changing section". In the variation shown in FIG. 5, parts which correspond to those shown in FIG. 1 are given identical numbers. Here, parts corresponding to the subtracter, the DCT section (DCT), quantizer (Q), inverse quantizer ($Q^{-1}$), inverse DCT section (IDCT), adder, and picture-differential controller of the video sending side in the conventional example are represented as "encoding section 601" in FIG. 5. On the other hand, parts corresponding to the inverse quantizer ($Q^{-1}$), inverse DCT section (IDCT), and adder of the video receiving side in the conventional example are represented as "decoding section 613" in FIG. 5. Additionally, in FIG. 5, picture memories (M1, M2, . . . Mn) and memory storing section (614a) are combined as "memory 614".

If a unit smaller than a picture is used as a processing unit for pictures, it is necessary to perform motion compensation in the region of each processing unit.

According to the above-mentioned first embodiment, in comparison with the conventional technique in which by changing the reference picture, error propagation is prevented while inter-picture coding is continued, even in a conventional case in which intra-picture coding must be performed because no reference picture exists in the PM section, the reference picture of the newest picture which was correctly received can be maintained in the PM section having the same number of PMs as the conventional case; thus, degradation of the video quality can be prevented. Therefore, even in a case in which the system cannot be desirably operated using the conventional technique, no problem occurs using the technique of the first embodiment.

Next, the second embodiment according to the present invention will be explained.

Figure 6:
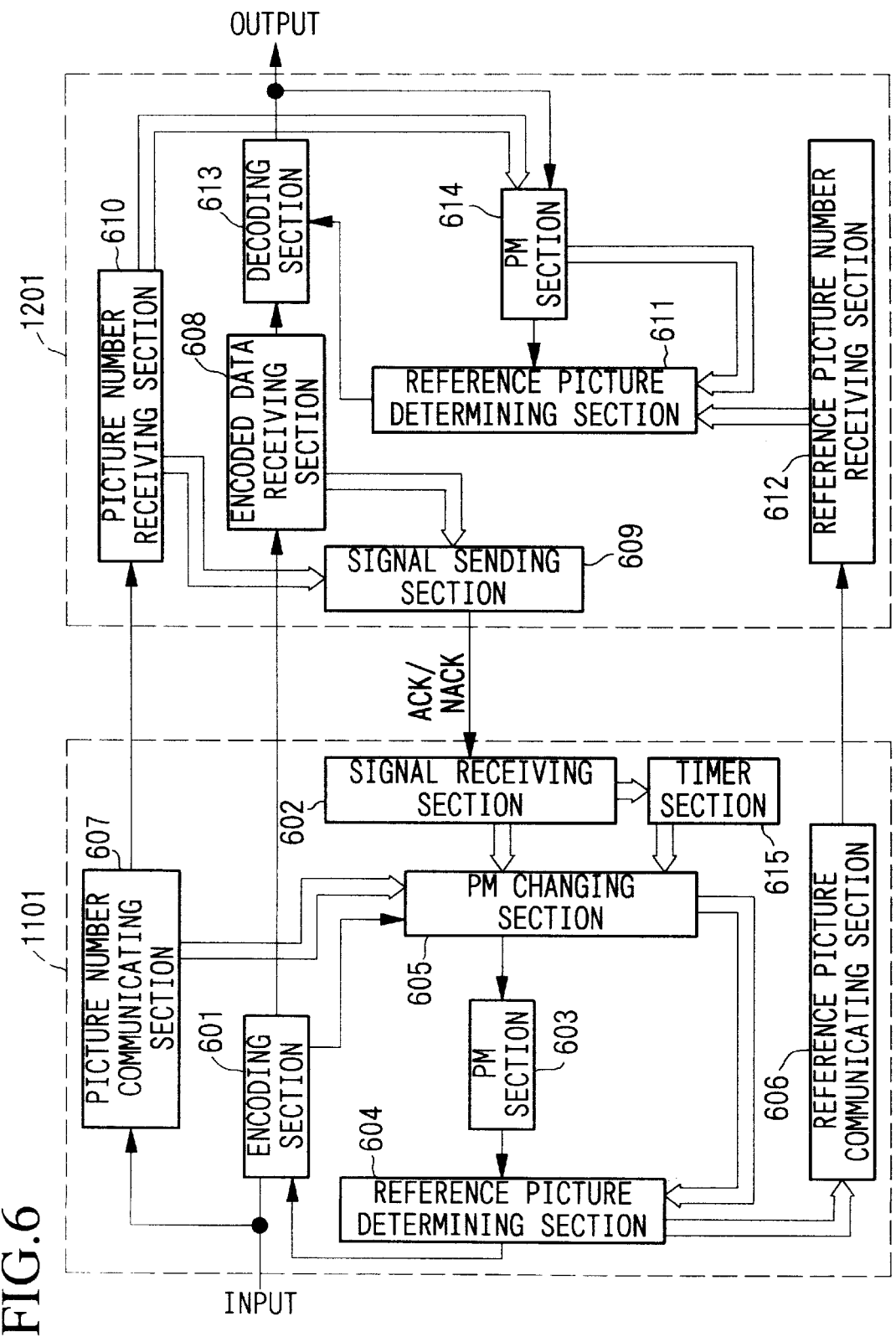
FIG. 6 is a block diagram showing a general configuration of the second embodiment according to the present invention.

FIG. 6 is a block diagram showing a general configuration of the second embodiment. In comparison with FIG. 1 (the block diagram showing a general configuration of the first embodiment), in FIG. 6, timer section 615 having a built-in timer is added. Other parts are identical to those shown in FIG. 1, and thus are given identical reference numerals of FIG. 1.

Figure 7:
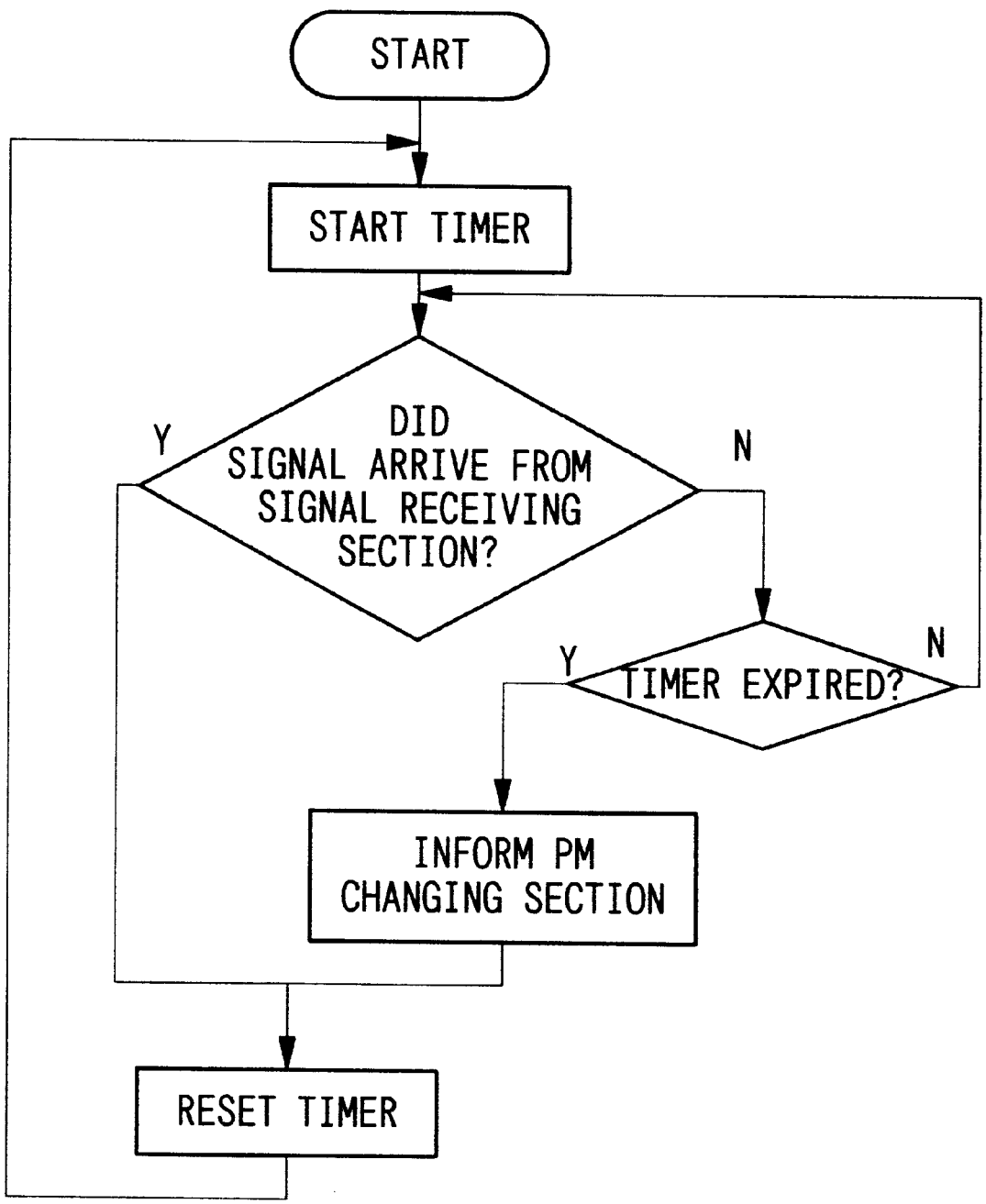
FIG. 7 is a flowchart showing the operational flow of the timer section in FIG. 6.

FIG. 7 shows the operational flow of timer section 615. In the operations of the present embodiment, in addition to the above-mentioned operations of each part in FIG. 1, signal receiving section 602 informs timer section 615 of an ACK or NACK signal when the receiving section receives such a signal from signal sending section 609 of the video receiving side. The timer section repeats restart by resetting a timer according to the above signal. If the timer section is not informed of the signal and thus the timer reaches the maximum limit, the timer section informs PM changing section 605 of the situation.

Figure 8:
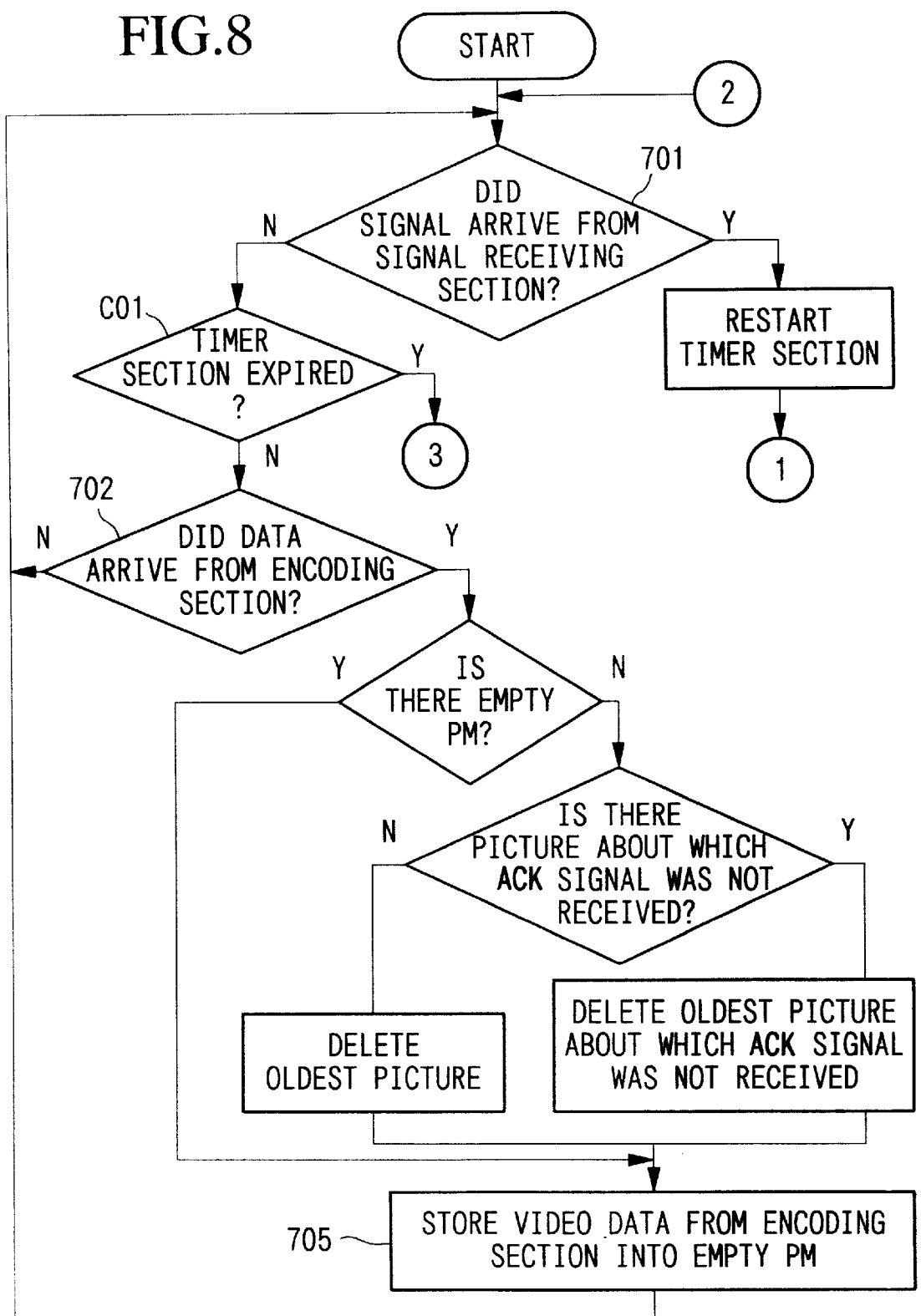
FIG. 8 is a (first) flowchart showing the operational flow of the PM changing section in FIG. 6.
Figure 9:
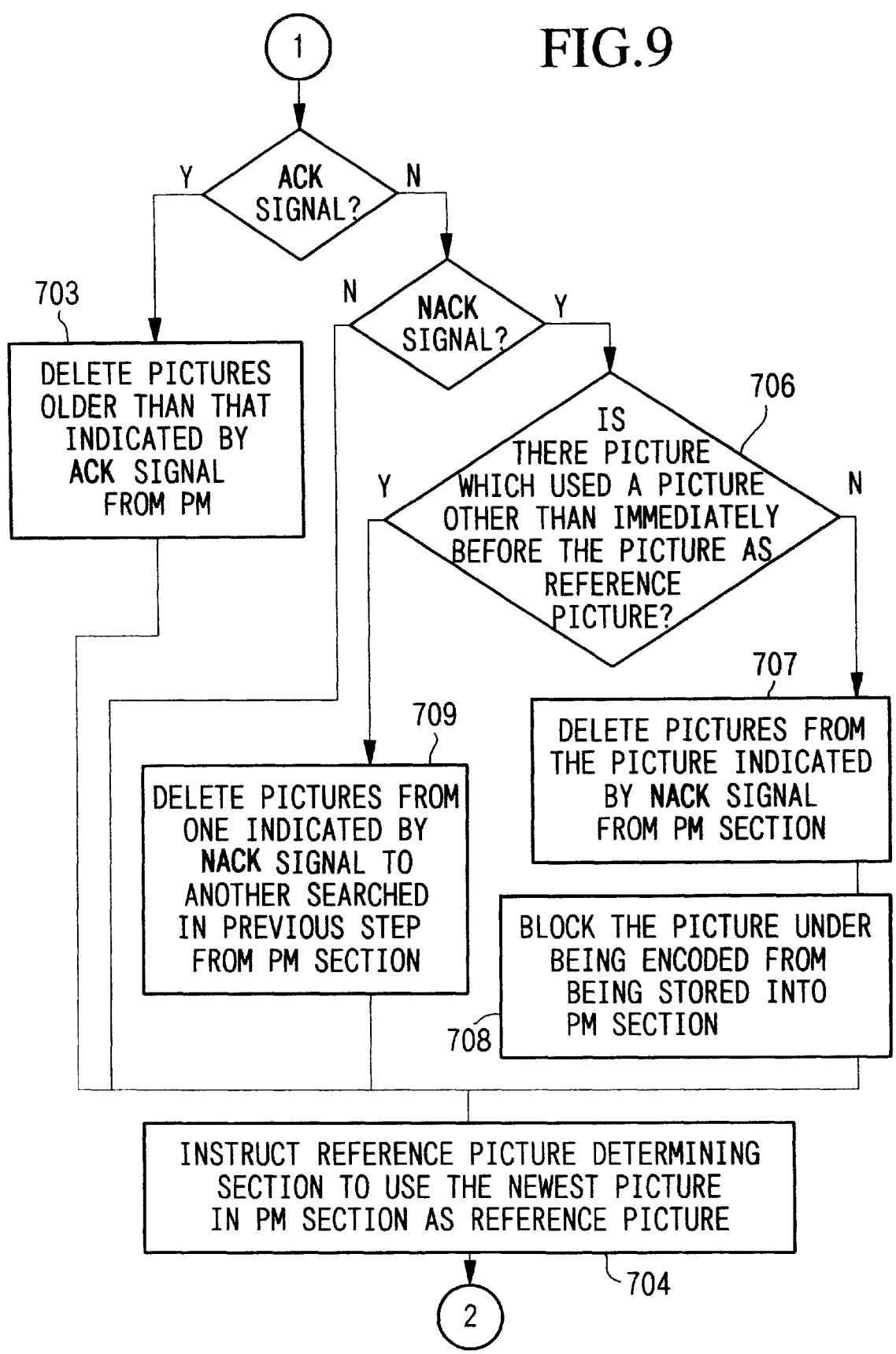
FIG. 9 is a (second) flowchart showing the operational flow of the PM changing section in FIG. 6.

FIGS. 8 and 9 show the operational flow of PM changing section 605 in the second embodiment. As shown in the flow, in addition to the operations explained in the first embodiment, the operation of changing the reference picture is performed also by referring to a signal from timer section 615 (see step C01). Here, "①" in FIG. 8 indicates that this position continues to position "①" in the flow of FIG. 9 while "②" in FIG. 9 indicates that this position continues to position "②" in the flow of FIG. 8; furthermore, "⑧" in FIG. 8 indicates that this position continues to position "③" in the flow of FIG. 9.

Figure 10:
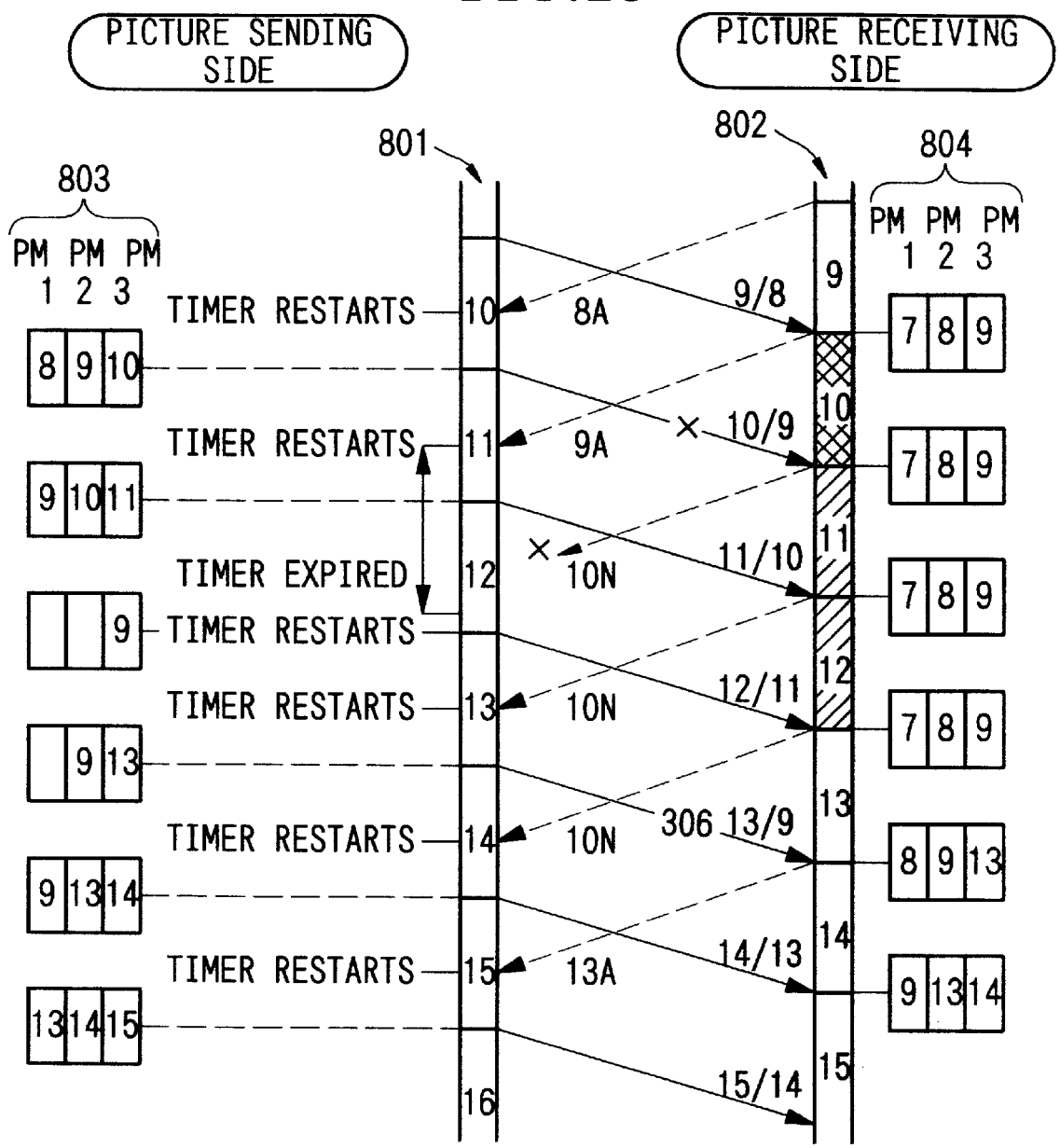
FIG. 10 is a diagram for explaining an operational example of the second embodiment.

FIG. 10 is a diagram for explaining a time-series operational example of the second example. The meaning of each reference numeral is identical to that used in FIG. 4; and an explanation thereof will be omitted here.

The timer section 615 resets its built-in timer when receiving an ACK or NACK signal, and repeats restart. The present operational example shows that the video data of picture "10" included an error, as in the case shown by FIG. 4. Furthermore, the NACK signal with respect to this error also included an error and the signal was lost (that is, signal receiving section 602 of the video sending side could not recognize the signal). In this case, the timer of timer section 615, which was started at the receiving of the ACK signal relating to picture "9", expires; thus, the expiration of the timer is communicated to PM changing section 605. The section 605 which received that information changes the reference picture used for picture "13" to the picture "9" about which an ACK signal was received.

Here, the predetermined timer value set in the timer section 615 may be determined with reference to a delay time of a round-trip signal.

Figure 11:
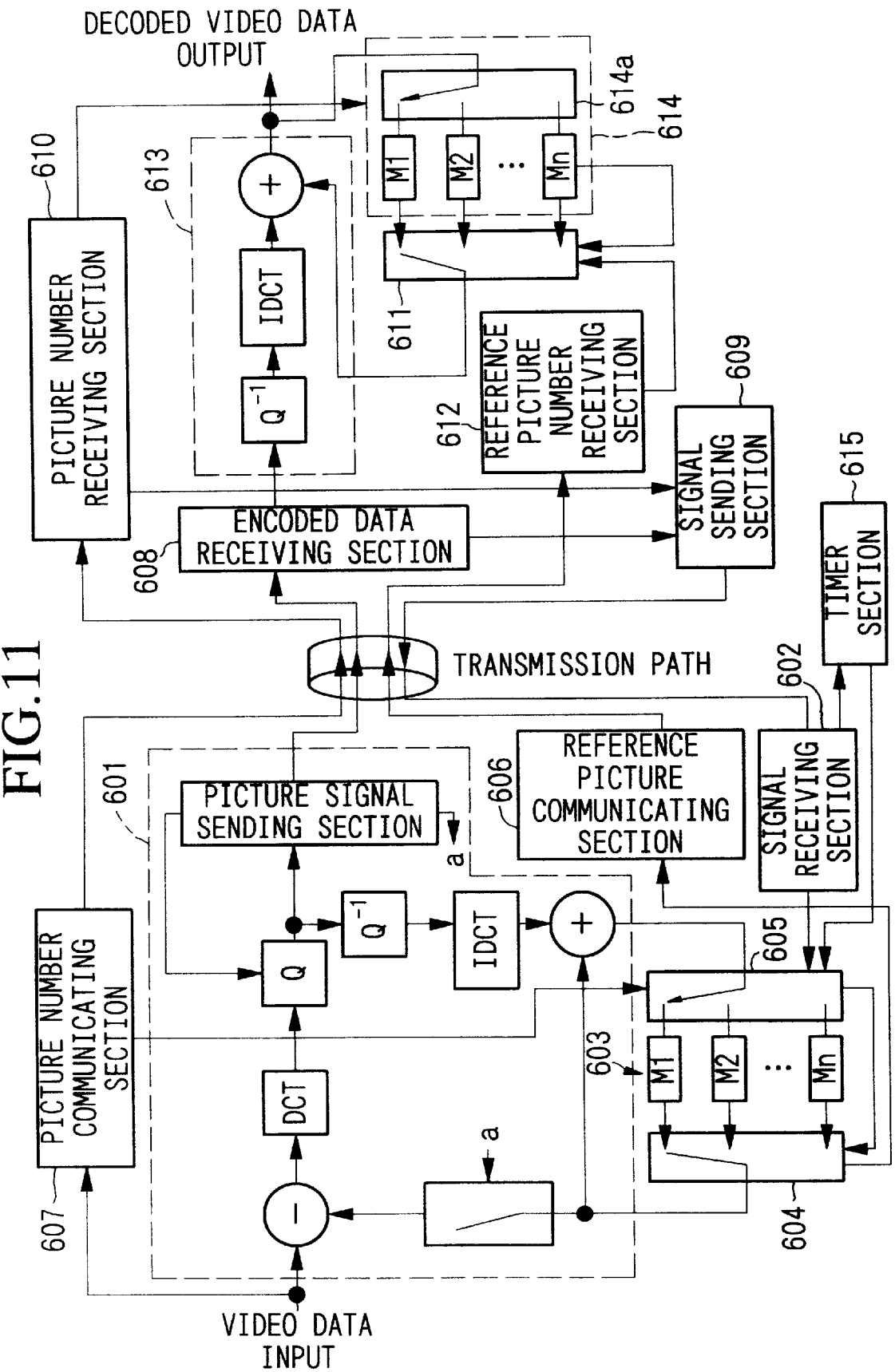
FIG. 11 is a block diagram showing a variation example of a combination system arrangement of the second embodiment and a general video coding method.

FIG. 11 shows a variation example of a combination system arrangement of the second embodiment and a general video coding method in which motion compensation and discrete cosine transformation (DCT) are combined. This figure shows the second variation which corresponds to the first variation shown in FIG. 5. Here, timer section 615 is added in comparison with FIG. 5. Other parts in FIG. 11 are identical to those of the variation (of the first embodiment) shown in FIG. 5, and thus are given identical reference numerals of the parts in FIG. 5.

According to the second variation, by adding the timer section, when a signal (especially, a NACK signal) from the video receiving side is not received at the video sending side due to an error or the like, or when signal receiving at the video sending side is delayed due to increase of the amount of transmission delay, processing delay of the receiving side, or the like, the reference picture can be promptly changed; thus, recovery from error-containing pictures can be advanced at the video receiving side.

More specifically, if the arrangement of the first embodiment is adopted in the case of FIG. 10, after a NACK signal relating to picture "10" (10N) from the video receiving side is received by the video sending side, the reference picture relating to picture "14" is changed. However, in the arrangement of the second embodiment, the reference picture relating to picture "13" can be changed in such a case.

Next, the third embodiment according to the present invention will be explained.

Figure 12:
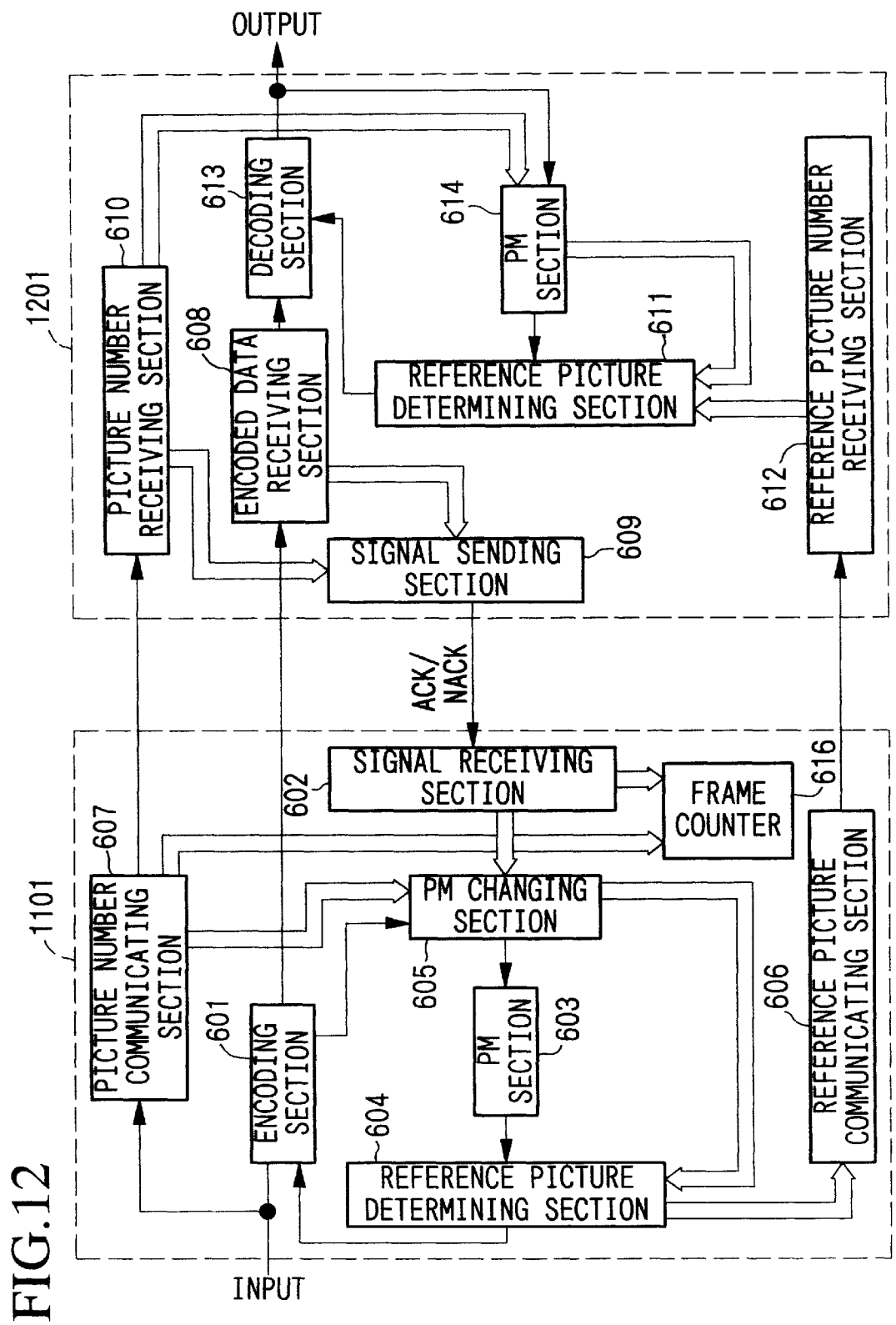
FIG. 12 is a block diagram showing a general configuration of the third embodiment according to the present invention.

FIG. 12 is a block diagram showing a general configuration of the third embodiment. In comparison with FIG. 1 which is the block diagram showing a general configuration of the first embodiment, picture counter 616 is added in FIG. 12.

Figure 13:
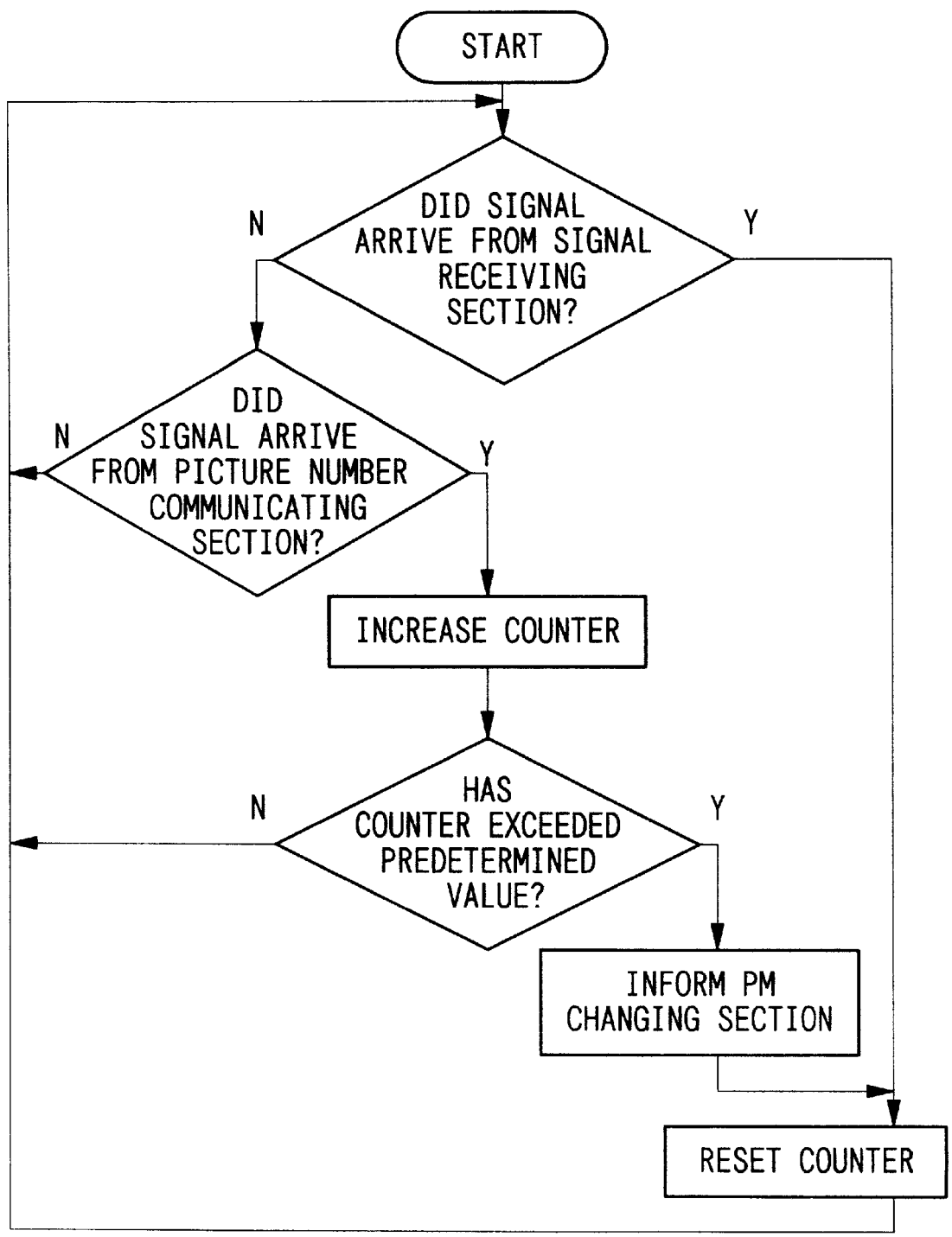
FIG. 13 is a flowchart showing the operational flow of the picture counter in FIG. 12.

FIG. 13 shows the operational flow of the picture counter 616. In the operations of the present embodiment, in addition to the above-mentioned operations of each part in FIG. 1, signal receiving section 602 informs picture counter 616 of an ACK or NACK signal when the receiving section receives such a signal from the signal sending section. The picture number communicating section 607 sends the picture number of the encoded picture to picture number receiving section 610 and also to picture counter 616. The picture counter 616 counts the number of pictures communicated by picture number communicating section 607, and resets the count value every time the counter is informed of the above signal. If the count value is not reset because of no information of the signal and thus the number of pictures exceeds a predetermined value, the picture counter informs the PM changing section 605 of the excess situation.

Figure 14:
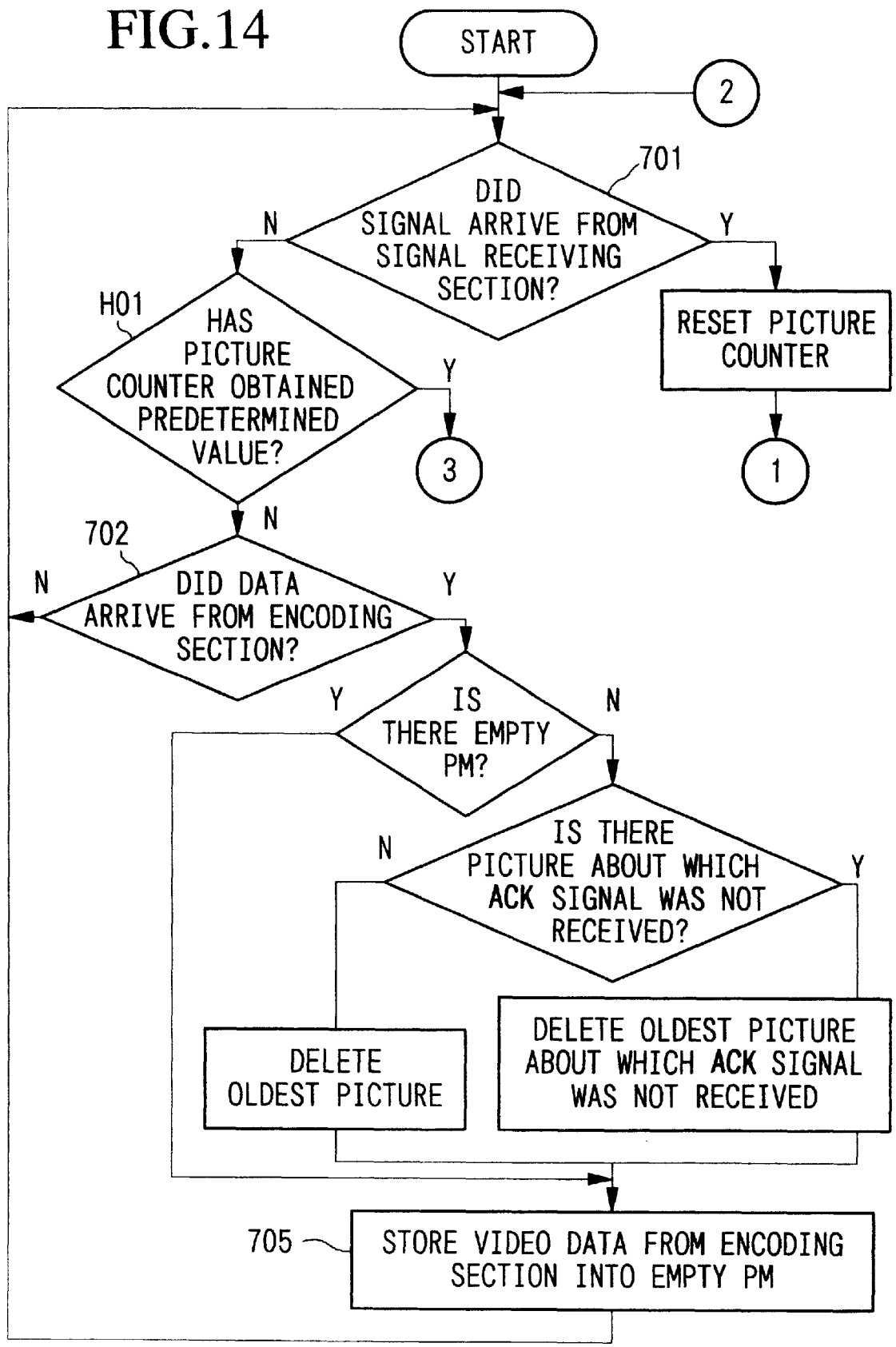
FIG. 14 is a (first) flowchart showing the operational flow of the PM changing section in FIG. 12.
Figure 15:
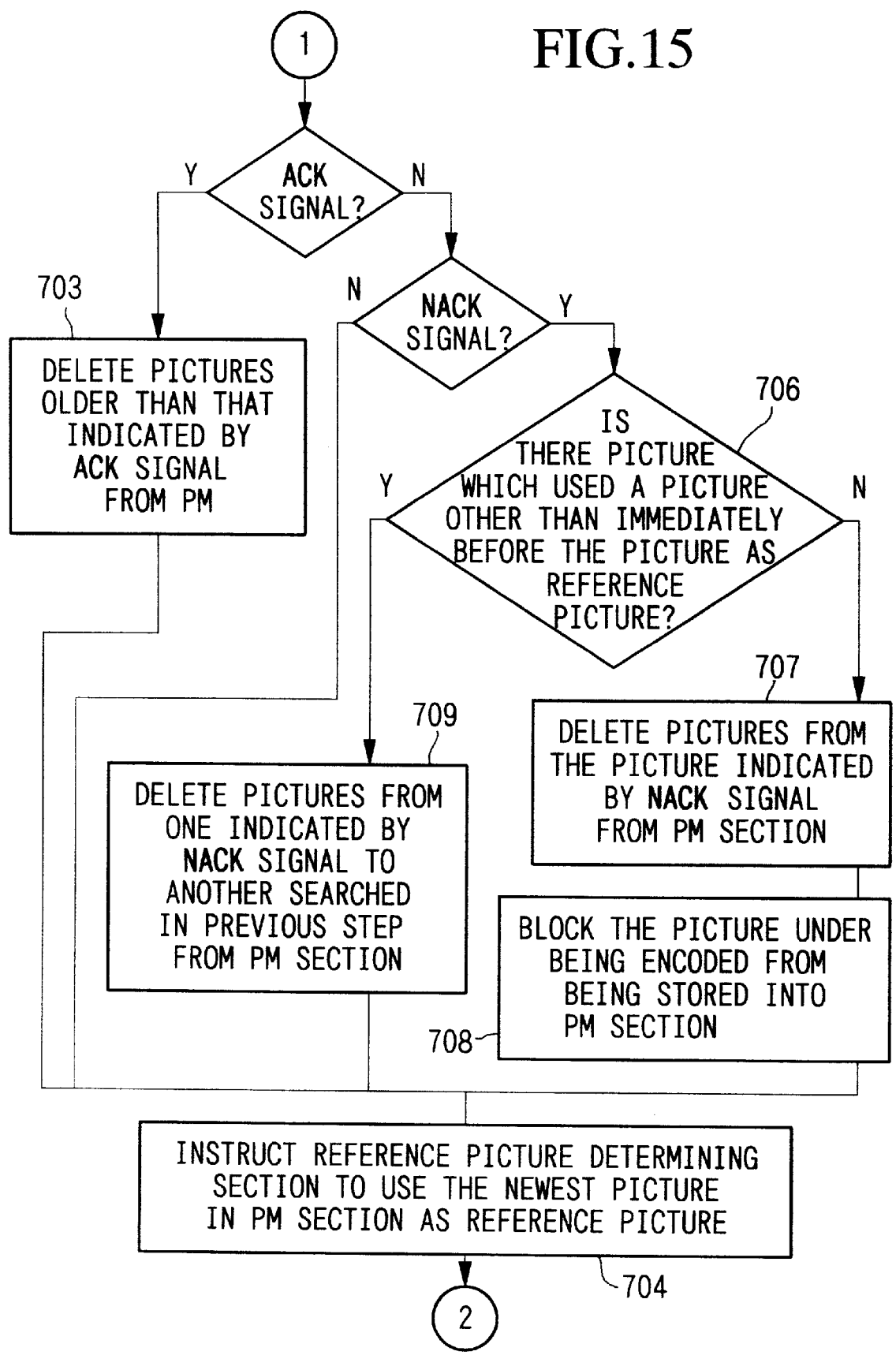
FIG. 15 is a (second) flowchart showing the operational flow of the PM changing section in FIG. 12.

FIGS. 14 and 15 show the operational flow of PM changing section 605 in the third embodiment. As shown in the flow, in addition to the operation explained in the first embodiment, the operation of changing the reference picture is performed also by referring to a signal from picture counter 616 (see step H01). Here, "①38 in FIG. 14 indicates that this position continues to position "①" in the flow of FIG. 15, while "②" in FIG. 15 indicates that this position continues to position "②" in the flow of FIG. 14; furthermore, "③" in FIG. 14 indicates that this position continues to position "③" in the flow of FIG. 15.

Figure 16:
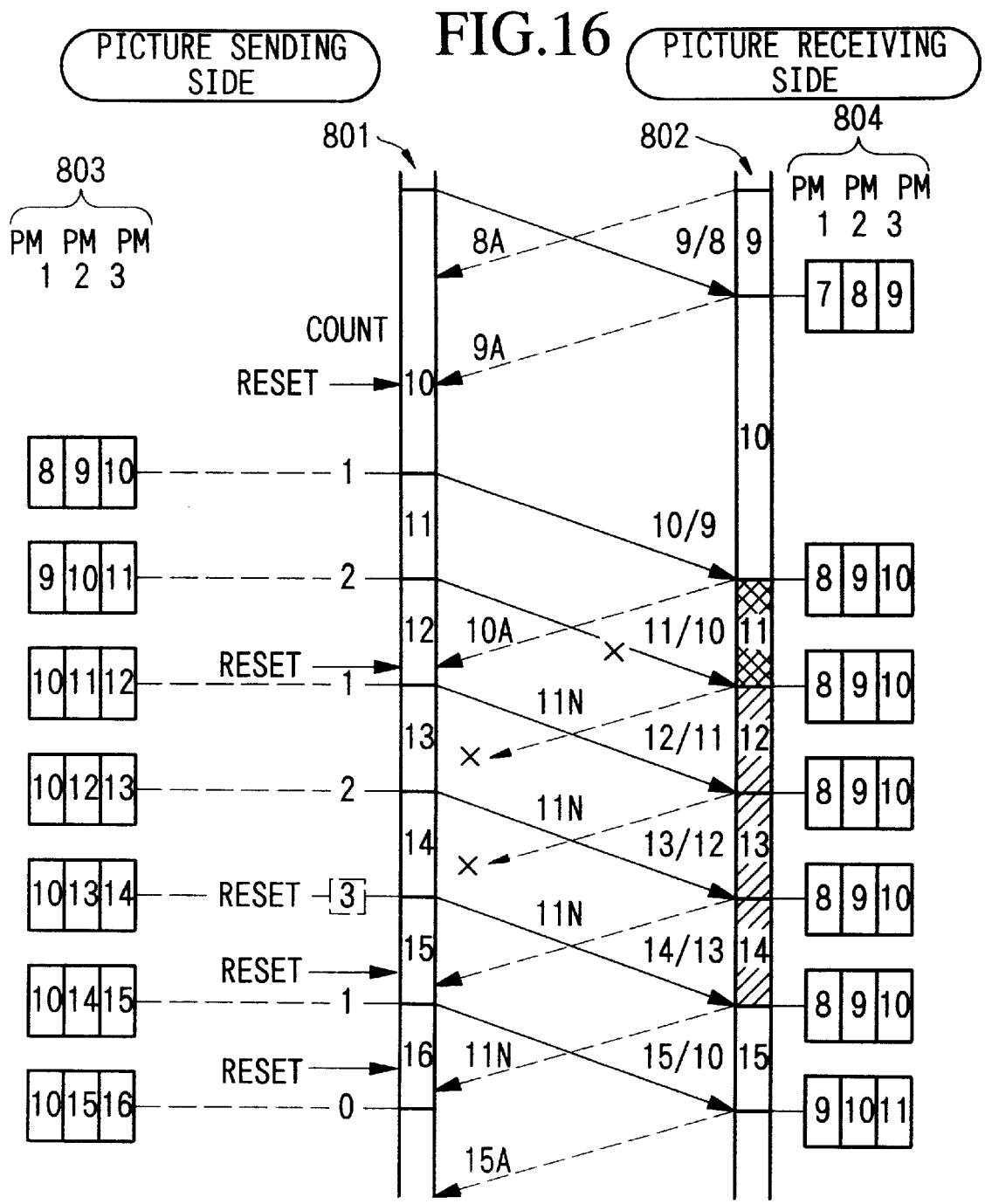
FIG. 16 is a diagram for explaining an operational example of the third embodiment.

FIG. 16 is a diagram for explaining a time-series operational example of the third example. The meaning of each reference numeral is identical to that used in FIG. 4; and an explanation thereof will be omitted here.

In the present operation, if the count value regarding picture counter 616 reaches "3", the result is communicated to PM changing section 605. The picture counter 616 counts the number of encoded pictures as the encoding progresses, but resets the count value if the counter receives an ACK or NACK signal.

The present operational example shows that the video data of picture "11" included an error. Furthermore, a situation in which the NACK signal with respect to this error (11N) also included an error and the signal was lost (that is, the video sending side could not recognize the signal) happened two successive times. In this case, the count value counted from the end of encoding of picture "12" reaches "3" because encoding of picture "14" is completed, the picture counter 616 informs PM changing section 605 of the result of counting. The PM changing section 605 changes the reference picture used for picture "15" to picture "10" about which an ACK signal is received.

Here, the (predetermined) value set in the picture counter 616 may be determined with reference to a delay time of a round-trip signal and the amount of video data to be encoded.

Figure 17:
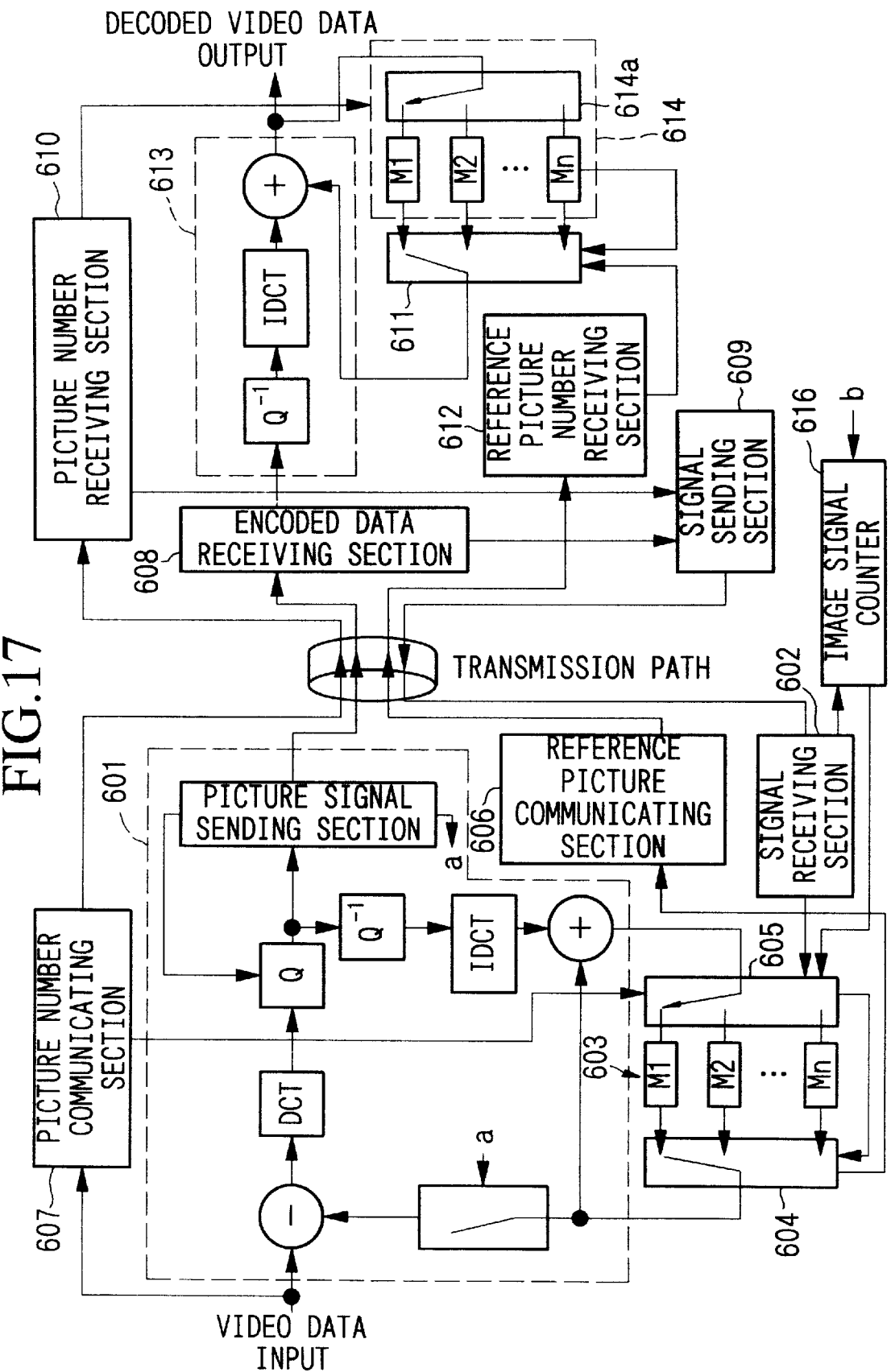
FIG. 17 is a block diagram showing a variation example of a combination system arrangement of the third embodiment and a general video coding method.
Figure 18:
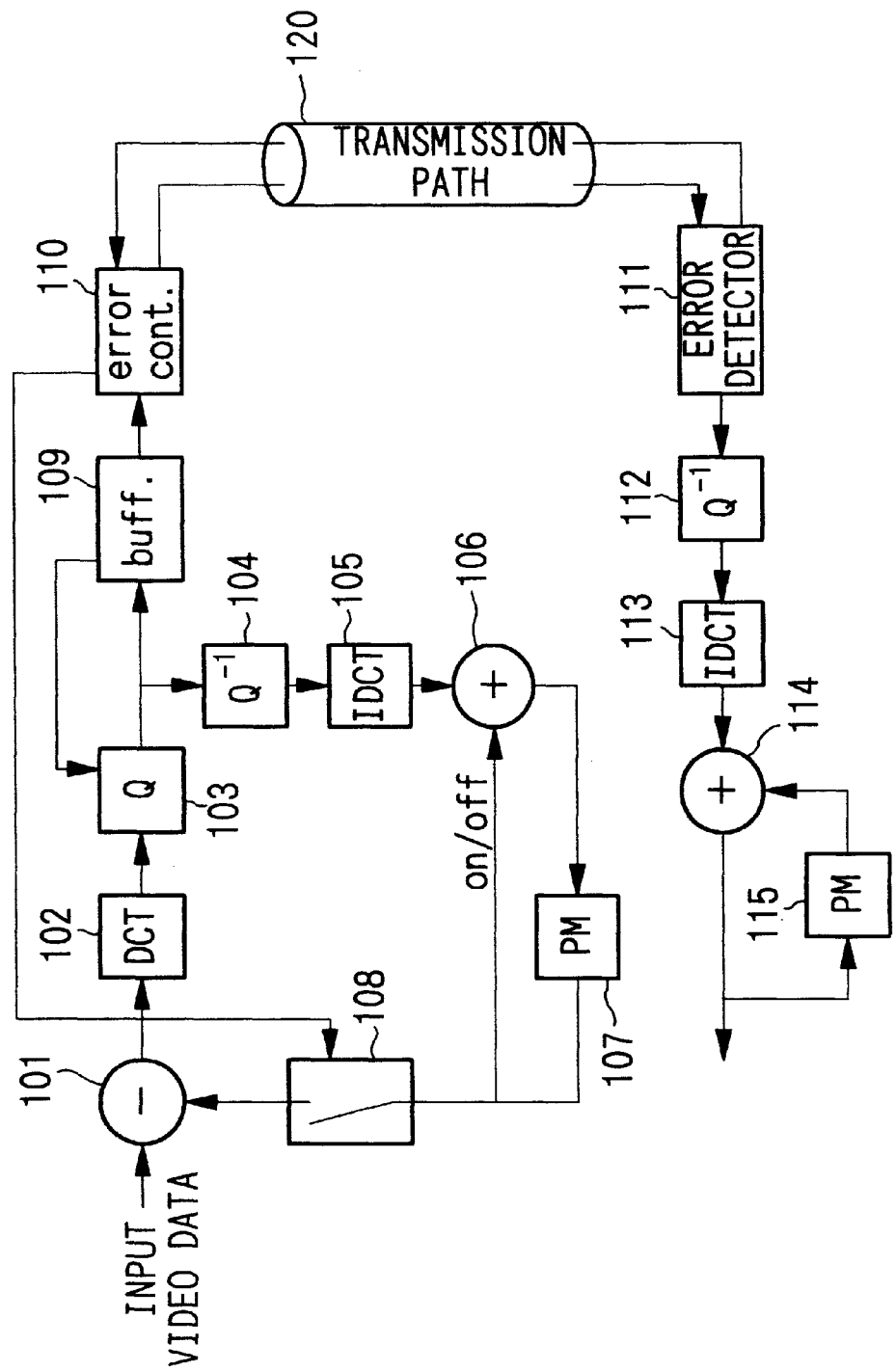
FIG. 18 is a block diagram showing a combination system arrangement of the first conventional example and a general video coding method.

FIG. 17 shows a variation example of a combination system arrangement of the third embodiment and a general video coding method in which motion compensation and discrete cosine transformation (DCT) are combined. This figure shows the third variation which corresponds to the first variation shown in FIG. 5. Here, picture signal counter 616 corresponding to the picture counter is added in comparison with FIG. 5. Other parts in FIG. 17 are identical to those of the variation (of the first embodiment) shown in FIG. 5, and thus are given identical reference numerals of the parts in FIG. 5.

According to the third variation, by providing the picture signal counter, when the amount of video data of each encoded picture varies, and when a signal (especially, a NACK signal) from the video receiving side is not received at the video sending side due to an error or the like, or when signal receiving at the video sending side is delayed due to increase of the amount of transmission delay, processing delay of the receiving side, or the like, the reference picture can be promptly changed; thus, recovery from error-containing pictures can be advanced at the video receiving side. In particular, in the case of the video encoding method using inter-picture differences, the amount of encoded data generally varies according to the characteristic of each picture unless the amount of data is controlled to be fixed by adjusting the resolution. Therefore, the present embodiment is effectively applied to such a case.

More specifically, if the arrangement of the second embodiment is adopted in the case of FIG. 16, it is suitable that the (predetermined) timer value be set to be larger than a time from the receiving of an ACK signal relating to picture "9" (that is, 9A) to the receiving of an ACK signal relating to picture "10" (that is, 10A). However, in this case, the timer started from the receiving of signal 10A expires after picture "15" is encoded, that is, during the encoding of picture "16". Accordingly, the changing of the reference picture is applied to the pictures from number "17". However, according to the third embodiment, the reference picture used for picture "15" can be changed.

Next, the fourth embodiment according to the present invention will be explained.

Figure 23:
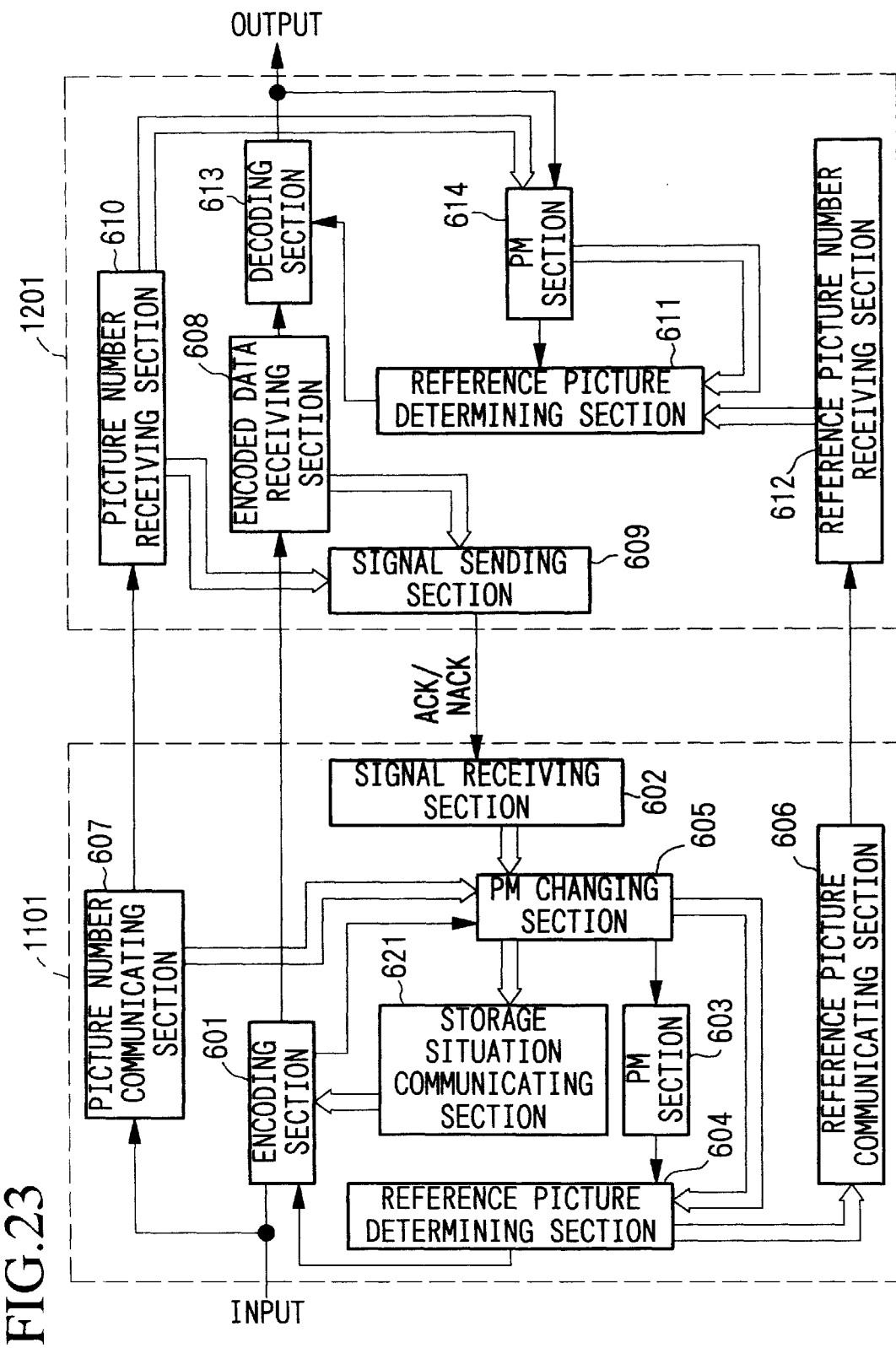
FIG. 23 is a block diagram showing a general configuration of the fourth embodiment according to the present invention.

FIG. 23 is a block diagram showing a general configuration of the fourth embodiment. In comparison with FIG. 1 which is the block diagram showing a general configuration of the first embodiment, storage situation communicating section 621 is added in FIG. 6.

In the operations of the above first embodiment, data stored in PM section 603 in the video sending side may be deleted. That is, in a particular case such that no reference picture exists for a correctly-received picture, all data are deleted and thus the contents of PM section 603 become empty. In such a case, it becomes impossible to perform the inter-picture coding method using inter-picture differences, and thus in the fourth embodiment, the coding method is switched to the intra-picture coding in such a situation.

That is, information relating to the storage of PM section 603 is communicated via PM changing section 605 to storage situation communicating section 621, and if no reference picture exists in PM section 603, the storage situation communicating section 621 informs encoding section 601 of the situation. The informed encoding section 601 then encodes an input picture using the intra-picture coding method.

In this way, it is possible to avoid an unanticipated case in which the encoding section tries to inter-picture-encode an input picture when no reference picture exists.

Next, the fifth embodiment according to the present invention will be explained.

Figure 24:
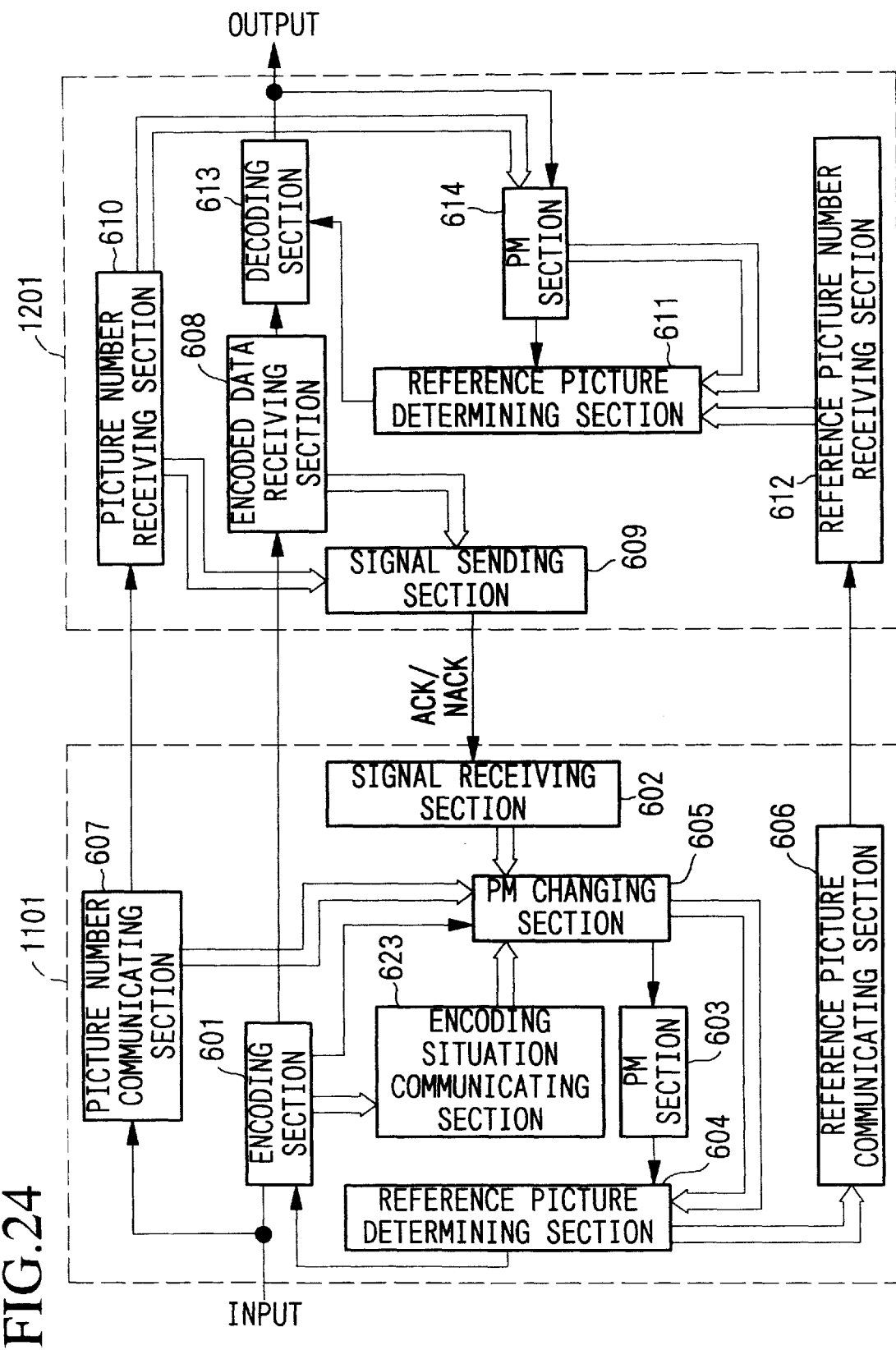
FIG. 24 is a block diagram showing a general configuration of the fifth embodiment according to the present invention.

FIG. 24 is a block diagram showing a general configuration of the fifth embodiment. In comparison with FIG. 1 which is the block diagram showing a general configuration of the first embodiment, encoding situation communicating section 623 is added in FIG. 24.

In the fifth embodiment, encoding section 601 conditionally performs the intra-picture coding method in addition to the inter-picture coding method. The encoding situation communicating section 623 detects a situation in which encoding section 601 performed intra-picture encoding, based on information relating to the encoding sent from encoding section 601, and informs PM changing section 605 of the detected situation.

Figure 25:
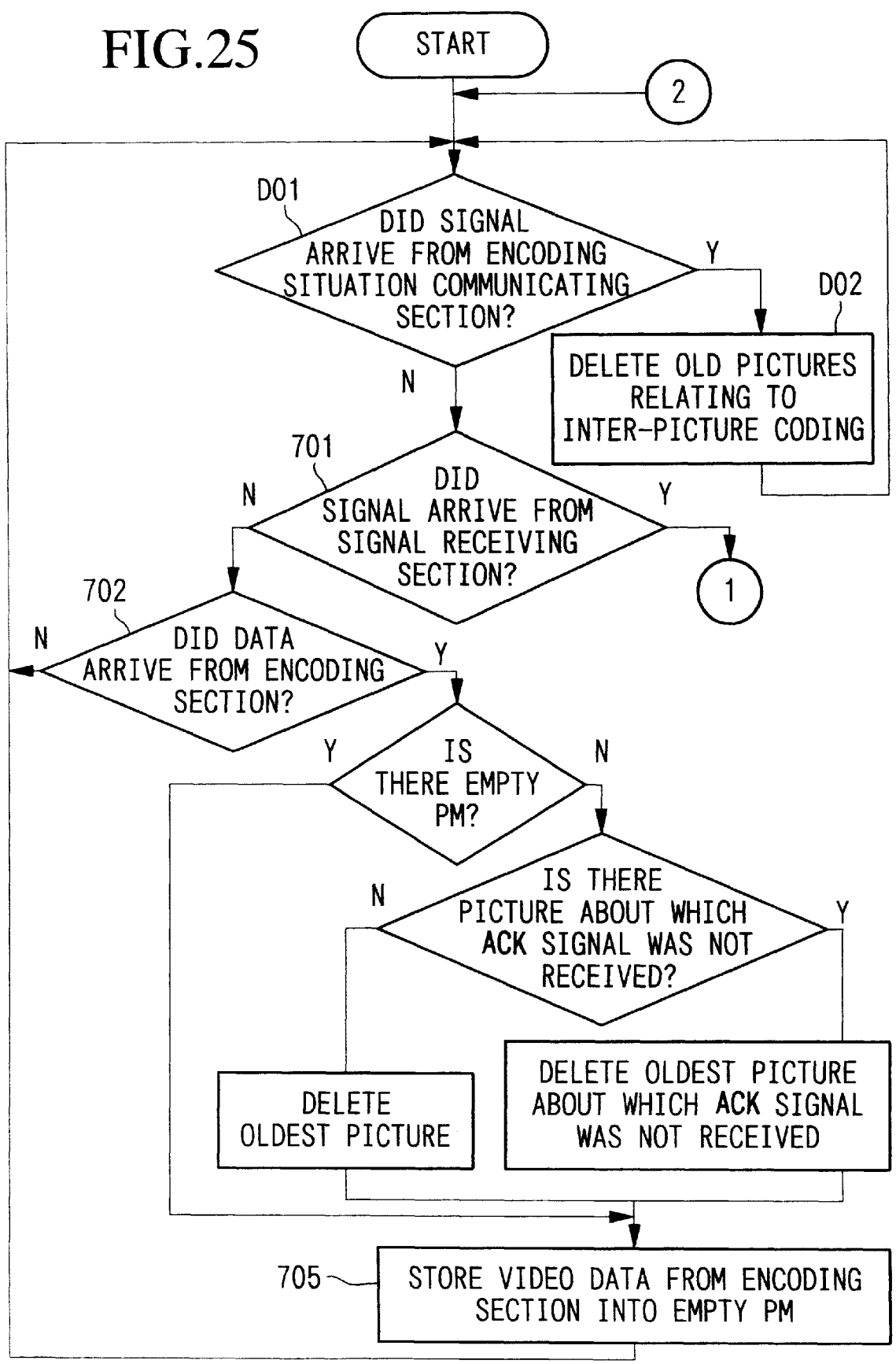
FIG. 25 is a partial flowchart showing the operational flow of the PM changing section in FIG. 24.

The PM changing section 605 changes PM section 603 based not only on a signal obtained via signal receiving section 602 from the video receiving side, but also on information from the encoding situation communicating section 623. The partial operational flow of PM changing section 605 in this case is shown in FIG. 25. This figure basically corresponds to the operations of the first embodiment as shown in FIG. 2, and is the same as that of the first embodiment except for added steps D01 and D02. That is, a flowchart obtained by combining FIGS. 25 and 3 shows a general flow of the operational example of PM changing section 605 in the fifth embodiment.

According to the present embodiment, when the intra-picture coding is performed, it is possible, in consideration of the effect of preventing error propagation according to this coding method, to change the memory to contents by which next encoding is more suitably performed, for example, by deleting unnecessary data stored in the memory.

Next, the sixth embodiment according to the present invention will be explained.

Figure 26:
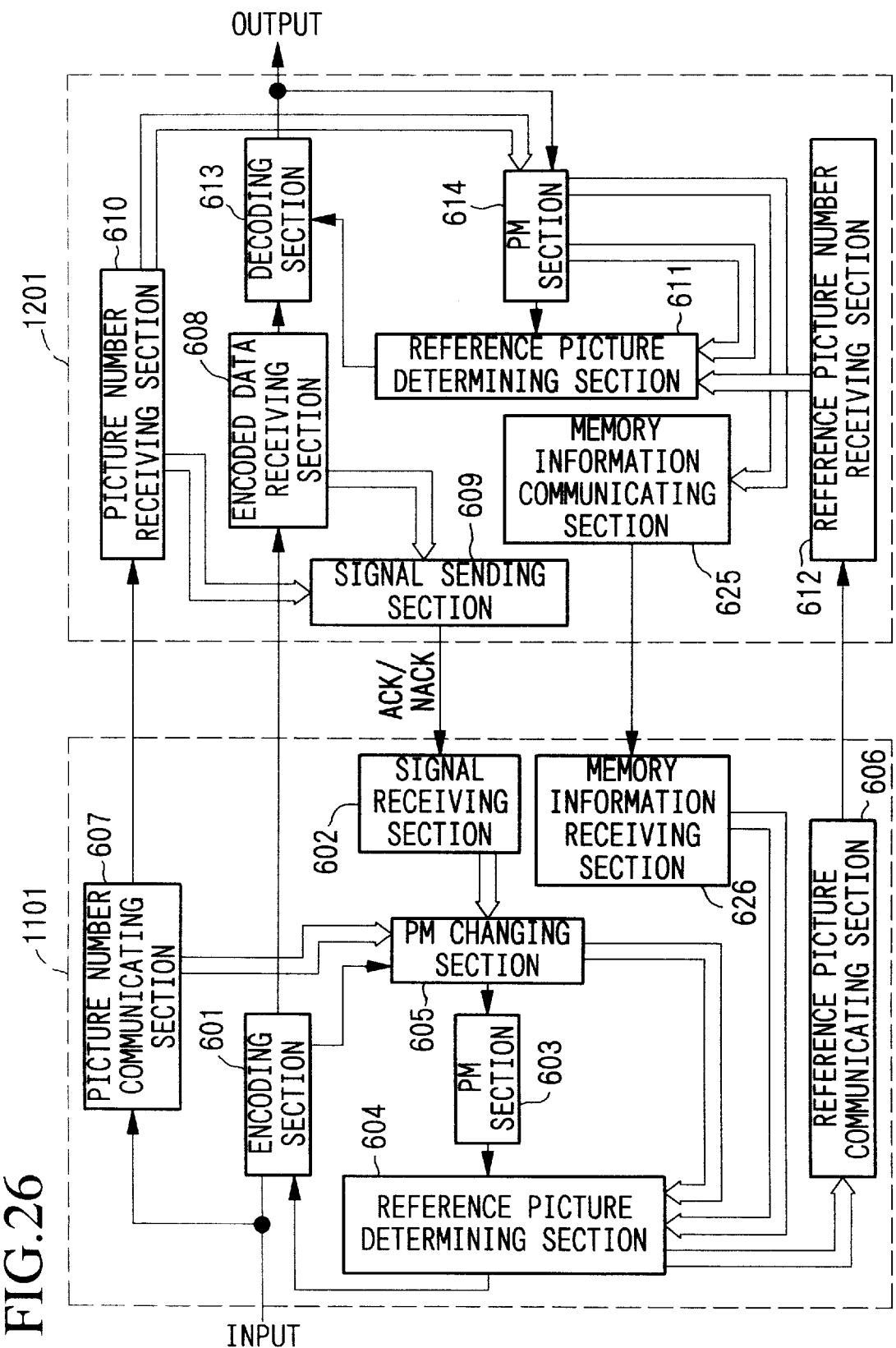
FIG. 26 is a block diagram showing a general configuration of the sixth embodiment according to the present invention.

FIG. 26 is a block diagram showing a general configuration of the sixth embodiment. In comparison with FIG. 1 which is the block diagram showing a general configuration of the first embodiment, memory information communication section 625 and memory information receiving section 626 are added in FIG. 26.

In the first embodiment, depending on operational timing between the sending and receiving sides, generation of an error, or the like, an unexpected situation such that reference picture determining section 604 selects a picture which does not exist in PM section 614 of the video receiving side as the reference picture may occur.

In the sixth embodiment, memory information communication section 625 at the video receiving side informs memory information receiving section 626 in the video sending side of information such as all the contents, or the oldest or newest content, stored in the PM section 614. The informed memory information receiving section 626 communicates the information to reference picture determining section 604. The determining section 604 determines the reference picture for the next encoded picture, based not only on the signal from PM changing section 605 but also on the information from memory information receiving section 626.

That is, reference picture determining section 604 determines the reference picture for the next encoded picture based on the signal from PM changing section 605; here, it is assumed that memory information communication section 625 at the video receiving side informs memory information receiving section 626 in the video sending side of all the contents stored in the PM section 614. In this case, according to, for example, the process of step 704 shown in FIG. 3, if reference picture determining section 604 is directed to use the newest picture in the PM section 603 as the reference picture, it is possible to not select the picture as the reference picture if the picture does not exist in PM section 614 of the video receiving side, and to read out a picture immediately before the picture from the PM section 603 as the reference picture to be sent to the encoding section 601.

According to the above operations, it is possible to prevent the reference picture determining section 604 from selecting a picture which does not exist in PM section 614 of the video receiving side as the reference picture.

Next, the seventh embodiment according to the present invention will be explained.

Figure 27:
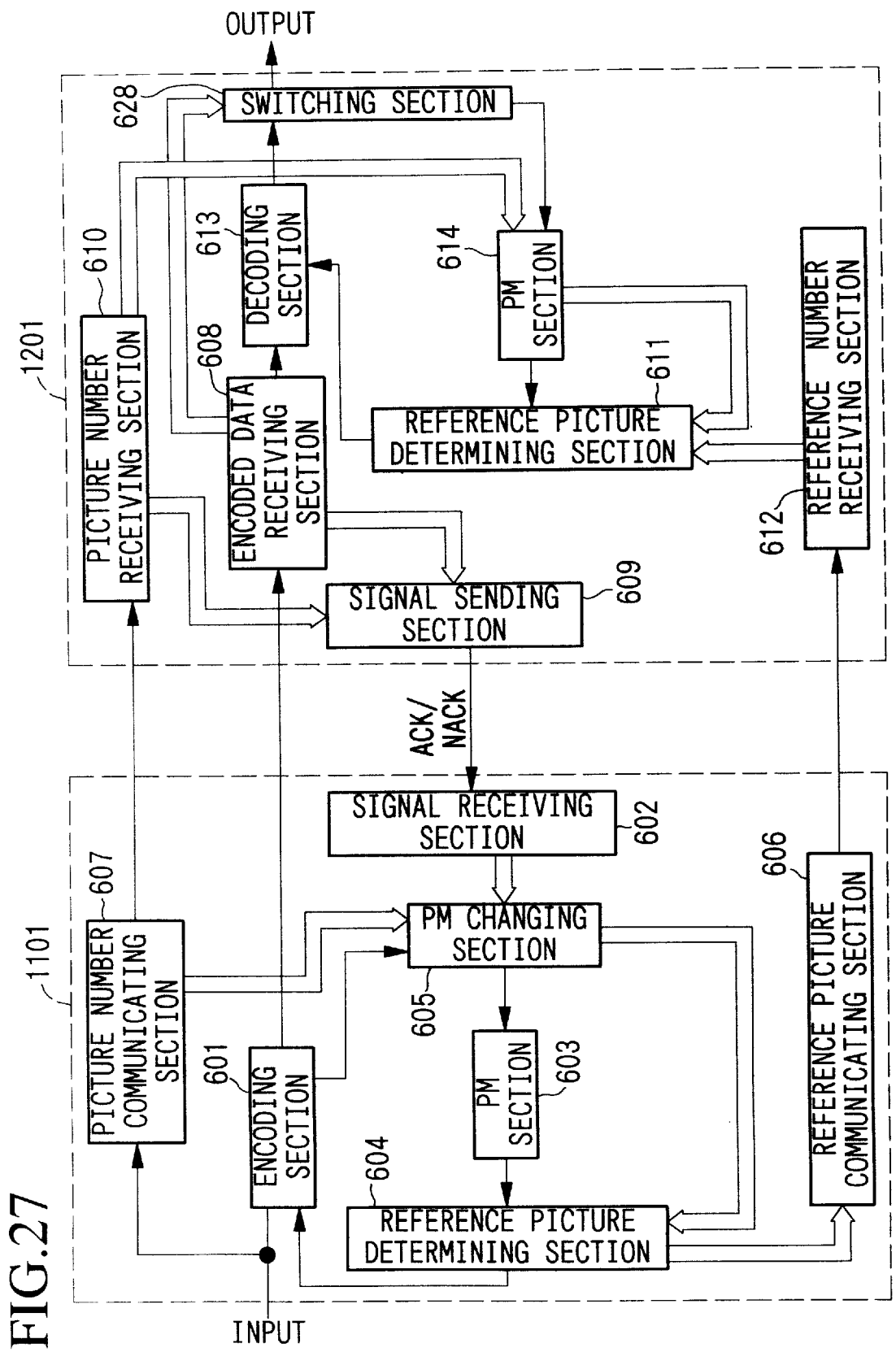
FIG. 27 is a block diagram showing a general configuration of the seventh embodiment according to the present invention.

FIG. 27 is a block diagram showing a general configuration of the seventh embodiment. In comparison with FIG. 1 which is the block diagram showing a general configuration of the first embodiment, switching section 628 is added in FIG. 27.

In the above-explained first embodiment, when error-free video data cannot be obtained, outputting of video data from encoding section 613 to a monitor or the like, and data storage into PM section 614 are not performed. However, in most practical cases, a system which outputs video data to a monitor or the like even in such a situation may be preferable to a user who observes the monitor. However, in this case, it is not preferable that a picture including an error be stored into PM section 614.

In the seventh embodiment, presence/absence of error is communicated from encoded data receiving section 608 to switching section 628, and video data including an error are also sent from encoding section 613 to switching section 628. The switching section 628 operates in a manner such that the output from decoding section 613 is further output to both PM section 614 and an external device such as a monitor if the information from the encoded data receiving section 608 indicates "no error" while if an "error" is indicated, the output from the decoding section 613 is further output only to an external device such as a monitor. In this way, it is possible to realize a more convenient system for users, in which an error-containing picture is intentionally used while only error-free video data are stored in the memory of the system.

What is claimed is:

1. A video transmission system comprising:
   in the video sending side:
      an encoding section for encoding an input picture by an inter-picture coding method of compressing data using inter-picture differences, and outputting encoded video data;
      a signal receiving section for receiving a signal from the video receiving side, the signal indicating presence or absence of an error relating to the encoded video data received at the video receiving side and a picture number of the encoded video data;
      a memory section having buffers for maintaining the encoded video data output from the encoding section as reference pictures used for the encoding based on the inter-picture coding method;
      a reference picture determining section for selecting a reference picture used in the encoding section among pictures stored in the memory section if at least one picture is stored in the memory section, based on information indicated by the signal received by the signal receiving section;
      a reference picture communicating section for communicating a picture number of the reference picture used in the encoding section to the video receiving side; and
      a picture number communicating section for communicating a picture number of the encoded video data output from the encoding section; and
   in the video receiving side:
      an encoded data receiving section for receiving the encoded video data output from the encoding section of the video sending side, and detecting and outputting presence or absence of an error relating to the video data;
      a picture number receiving section for receiving the picture number of the encoded video data communicated from the picture number communicating section of the video sending side;
      a signal sending section for sending the video sending side a signal which indicates the picture number of the encoded video data received by the picture number receiving section and the presence or absence of an error with respect to the relevant video data which was detected by the encoded data receiving section;
      a decoding section for decoding the encoded video data received by the encoded data receiving section and outputting decoded video data;
      a memory section having buffers for maintaining the decoded video data output from the decoding section as reference pictures used for the decoding;
      a reference picture number receiving section for receiving the picture number of the reference picture used at the time of encoding, communicated from the reference picture communicating section of the video sending side; and
      a reference picture determining section for selecting a reference picture used in the decoding section among pictures stored in the memory section if at least one picture is stored in the memory section, according to the picture number of the reference picture received by the reference picture number receiving section;
      the system further comprising:
         memory changing means for performing control of data storage of the encoded video data output from the encoding section into the memory section based on information indicated by the signal received by the signal receiving section of the video sending side, the control including determination whether new data are stored, determination of an area for storing data in the memory section, and deletion of data stored in the memory section.

2. A video transmission system as claimed in claim 1, wherein the control of data storage performed by the memory changing section includes deletion of reference pictures older than a reference picture used for the newest encoded video data which was correctly received, among reference pictures stored in the memory section.

3. A video transmission system as claimed in claim 1, wherein the control of data storage performed by the memory changing section includes deletion of a reference picture used for the encoded video data about which a receiving error is communicated from the video receiving side, among reference pictures stored in the memory section.

4. A video transmission system as claimed in claim 1, wherein a unit for processing the input picture is selected from the group consisting of a picture, a small area of a picture as a constituent of the picture, and a cluster of pixels which organizes the small area.

5. A video transmission system as claimed in claim 1, further comprising in the video sending side:
   timer means for determining whether the signal receiving section received the signal from the video receiving side within a predetermined time, and informing the memory changing section of a result of the determination if it is determined that the signal receiving section did not receive the signal; and
   wherein if the memory changing means is informed by the timer means, the memory changing means performs the control of data storage of the memory section based on content of the information.

6. A video transmission system as claimed in claim 1, further comprising in the video sending side:
   picture counting means for determining whether the signal receiving section received the signal from the video receiving side while the encoding section has encoded a predetermined number of pictures, and informing the memory changing section of a result of the determination if it is determined that the signal receiving section did not receive the signal; and
   wherein if the memory changing means is informed by the picture counting means, the memory changing means performs the control of data storage of the memory section based on content of the information.

7. A video transmission system as claimed in claim 1, further comprising in the video sending side:
   storage situation communicating means for monitoring contents of the memory section of the sending side, and informing the encoding section if no reference picture usable for the inter-picture coding method exists in the memory section; and
   wherein if the encoding section is informed by the storage situation communicating means, the encoding section encodes the next picture using an intra-picture coding method.

8. A video transmission system as claimed in claim 1, wherein:
   the encoding section uses both the inter-picture coding method and an intra-picture coding method, and performs each encoding operation using any one of the methods, and the system further comprises in the video sending side:
      encoding situation communicating means for informing the memory changing means of a situation in which the intra-picture coding method was performed by the encoding section if the encoding section did so; and
      wherein when the memory changing means is informed by the encoding situation communicating means, the memory changing means performs the control of data storage of the memory section based on content of the information.

9. A video transmission system as claimed in claim 1, further comprising:
   in the video receiving side, storage situation communicating means for communicating information on the pictures stored in the memory section of the video receiving side to the video sending side; and
   in the video sending side, storage situation receiving means for receiving the information on the pictures communicated by the storage situation communicating means, and further communicating the received information to the reference picture determining section of the sending side;
   wherein the reference picture determining section of the video sending side selects the reference picture based on the information indicated by the signal received by the signal receiving section and the information communicated by the storage situation receiving means.

10. A video transmission system as claimed in claim 1, further comprising in the video receiving side:
    switching means for receiving information on the presence or absence of an error, which was detected by the encoded data receiving section, and for controlling such that if an error is present, the output from the decoding section is not sent to the memory section of the receiving side, while if an error is absent, the output from the decoding section is sent to said memory section.

11. A video transmission method comprising the steps of:
    regarding the video sending side:
       encoding an input picture by an inter-picture coding method of compressing data using inter-picture differences, and outputting encoded video data;
       receiving a signal from the video receiving side, the signal indicating presence or absence of an error relating to the encoded video data received at the video receiving side and a picture number of the encoded video data;
       selecting a reference picture used at the time of encoding among pictures stored in a memory section, which has buffers for maintaining the output encoded video data as reference pictures used for the encoding based on the inter-picture coding method, if at least one picture is stored in the memory section, based on information indicated by the signal received from the video receiving side;
       communicating a picture number of the reference picture used at the time of encoding to the video receiving side; and
       communicating a picture number of the output encoded video data; and
    regarding the video receiving side:
       receiving the encoded video data output from the video sending side, and detecting and outputting presence or absence of an error relating to the video data;
       receiving the picture number of the encoded video data communicated from the video sending side;
       sending the video sending side a signal which indicates the picture number of the received encoded video data and the detected presence or absence of an error with respect to the relevant video data;
       decoding the received encoded video data and outputting decoded video data;
       receiving the picture number of the reference picture used at the time of encoding, communicated from the video sending side; and selecting a reference picture used at the time of decoding among pictures stored in a memory section, which has buffers for maintaining the output decoded video data as reference pictures used for the decoding, if at least one picture is stored in the memory section, according to the received picture number of the reference picture, the method further comprising the step of:

performing control of data storage of the output encoded video data into the memory section based on information indicated by the signal received by the video sending side, the control including determination whether new data are stored, determination of an area for storing data in the memory section, and deletion of data stored in the memory section.

12. A video transmission method as claimed in claim 11, wherein the control of data storage into the memory section includes deletion of reference pictures older than a reference picture used for the newest encoded video data which was correctly received, among reference pictures stored in the memory section.

13. A video transmission method as claimed in claim 11, wherein the control of data storage into the memory section includes deletion of a reference picture used for the encoded video data about which a receiving error is communicated from the video receiving side, among reference pictures stored in the memory section.

14. A video transmission method as claimed in claim 11, wherein a unit for processing the input picture is selected from the group consisting of a picture, a small area of a picture as a constituent of the picture, and a cluster of pixels which organizes the small area.

15. A video transmission method as claimed in claim 11, further comprising the step of:

determining whether the signal sending side received the signal from the video receiving side within a predetermined time, and outputting information indicating a result of the determination if it is determined that the signal was not received; and wherein if said information is output, the step of performing the control of data storage comprises performing the control based on the information.

16. A video transmission method as claimed in claim 11, further comprising the step of:

determining whether the signal sending side received the signal from the video receiving side while a predetermined number of pictures are encoded, and outputting information indicating a result of the determination if it is determined that the signal was not received; and wherein if said information is output, the step of performing the control of data storage comprises performing the control based on the information.

17. A video transmission method as claimed in claim 11, further comprising the step of:

monitoring contents of the memory section of the sending side, and outputting information if no reference picture usable for the inter-picture coding method exists in the memory section; and wherein if said information is output, the step of encoding an input picture comprises encoding the next picture using an intra-picture coding method.

18. A video transmission method as claimed in claim 11, wherein:

the step of encoding an input picture uses both the inter-picture coding method and an intra-picture coding method, and each encoding operation uses any one of said methods, and the video transmission method further comprises the step of:

outputting information indicating a situation in which the intra-picture coding method was performed if the situation arose; and wherein when said information is output, the step of performing the control of data storage comprises performing the control based on the information.

19. A video transmission method as claimed in claim 11, further comprising:

communicating information on the pictures stored in the memory section of the video receiving side to the video sending side; and receiving said information at the sending side, wherein the step of selecting a reference picture at the video sending side comprises selecting the reference picture based on the information indicated by the received signal communicating the presence or absence of an error and picture number of the encoded video data, and the information on the pictures stored in the memory section of the video receiving side.

20. A video transmission method as claimed in claim 11, further comprising the step of receiving information on the presence/absence of error, which was detected at the video receiving side, and controlling such that if an error is present, the decoded output is not sent to the memory section of the receiving side, while if an error is absent, the decoded output is sent to said memory section.

21. A video sending apparatus comprising:

an encoding section for encoding an input picture by an inter-picture coding method of compressing data using inter-picture differences, and outputting encoded video data;

a signal receiving section for receiving a signal from the video receiving side, the signal indicating presence or absence of an error relating to the encoded video data received at the video receiving side and a picture number of the encoded video data;

a memory section having buffers for maintaining the encoded video data output from the encoding section as reference pictures used for the encoding based on the inter-picture coding method;

a reference picture determining section for selecting a reference picture used in the encoding section among pictures stored in the memory section if at least one picture is stored in the memory section, based on information indicated by the signal received by the signal receiving section;

a reference picture communicating section for communicating a picture number of the reference picture used in the encoding section to the video receiving side; and a picture number communicating section for communicating a picture number of the encoded video data output from the encoding section; the system further comprising:

memory changing means for performing control of data storage of the encoded video data output from the encoding section into the memory section based on information indicated by the signal received by the signal receiving section, the control including determination whether new data are stored, determination of an area for storing data in the memory section, and deletion of data stored in the memory, section.

22. A video sending apparatus as claimed in claim 21, wherein the control of data storage performed by the memory changing section includes deletion of reference pictures older than a reference picture used for the newest encoded video data which was correctly received, among reference pictures stored in the memory section.

23. A video sending apparatus as claimed in claim 21, wherein the control of data storage performed by the memory changing section includes deletion of a reference picture used for the encoded video data about which a receiving error is communicated from the video receiving side, among reference pictures stored in the memory section.

24. A video sending apparatus as claimed in claim 21, wherein a unit for processing the input picture is selected from the group consisting of a picture, a small area of a picture as a constituent of the picture, and a cluster of pixels which organizes the small area.

25. A video sending apparatus as claimed in claim 21, further comprising:
   timer means for determining whether the signal receiving section received the signal from the video receiving side within a predetermined time, and informing the memory changing section of a result of the determination if it is determined that the signal receiving section did not receive the signal; and
   wherein if the memory changing means is informed by the timer means, the memory changing means performs the control of data storage of the memory section based on content of the information.

26. A video sending apparatus as claimed in claim 21, further comprising:
   picture counting means for determining whether the signal receiving section received the signal from the video receiving side while the encoding section has encoded a predetermined number of pictures, and informing the memory changing section of a result of the determination if it is determined that the signal receiving section did not receive the signal; and
   wherein if the memory changing means is informed by the picture counting means, the memory changing means performs the control of data storage of the memory section based on content of the information.

27. A video sending apparatus as claimed in claim 21, further comprising:
   storage situation communicating means for monitoring contents of the memory section, and informing the encoding section if no reference picture usable for the inter-picture coding method exists in the memory section; and
   wherein if the encoding section is informed by the storage situation communicating means, the encoding section encodes the next picture using an intra-picture coding method.

28. A video sending apparatus as claimed in claim 21, wherein:
   the encoding section uses both the inter-picture coding method and an intra-picture coding method, and performs each encoding operation using any one of the methods, and the system further comprises:
      encoding situation communicating means for informing the memory changing means of a situation in which the intra-picture coding method was performed by the encoding section if the encoding section did so; and
      wherein when the memory changing means is informed by the encoding situation communicating means, the memory changing means performs the control of data storage of the memory section based on content of the information.

29. A video sending apparatus as claimed in claim 21, further comprising:
   storage situation receiving means for receiving information on pictures stored in a memory section of the video receiving side, communicated from the receiving side, and further communicating the received information -to the reference picture determining section;
   wherein the reference picture determining section selects the reference picture based on the information indicated by the signal received by the signal receiving section and the information communicated by the storage situation receiving means.

30. A video receiving apparatus comprising:
   an encoded data receiving section for receiving encoded video data output from the video sending side, which were encoded by an inter-picture coding method of compressing data using inter-picture differences, and detecting and outputting presence or absence of an error relating to the video data;
   a picture number receiving section for receiving a picture number of the encoded video data communicated from the video sending side;
   a signal sending section for sending the video sending side a signal which indicates the picture number of the encoded video data received by the picture number receiving section and the presence or absence of an error with respect to the relevant video data which was detected by the encoded data receiving section;
   a decoding section for decoding the encoded video data received by the encoded data receiving section and outputting decoded video data;
   a memory section having buffers for maintaining the decoded video data output from the decoding section as reference pictures used for the decoding;
   a reference picture number receiving section for receiving a picture number of the reference picture used at the time of encoding, communicated from the video sending side; and
   a reference picture determining section for selecting a reference picture used in the decoding section among pictures stored in the memory section if at least one picture is stored in the memory section, according to the picture number of the reference picture received by the reference picture number receiving section; the system further comprising:
      storage situation communicating means for communicating information on the pictures stored in the memory section to the video sending side.

31. A video receiving apparatus comprising:
   an encoded data receiving section for receiving encoded video data output from the video sending side, which were encoded by an inter-picture coding method of compressing data using inter-picture differences, and detecting and outputting presence or absence of an error relating to the video data;
   a picture number receiving section for receiving a picture number of the encoded video data communicated from the video sending side;
   a signal sending section for sending the video sending side a signal which indicates the picture number of the encoded video data received by the picture number receiving section and the presence or absence of an error with respect to the relevant video data which was detected by the encoded data receiving section;
   a decoding section for decoding the encoded video data received by the encoded data receiving section and outputting decoded video data;

a memory section having buffers for maintaining the decoded video data output from the decoding section as reference pictures used for the decoding;

a reference picture number receiving section for receiving a picture number of the reference picture used at the time of encoding, communicated from the video sending side; and a reference picture determining section for selecting a reference picture used in the decoding section among pictures stored in the memory section if at least one picture is stored in the memory section, according to the picture number of the reference picture received by the reference picture number receiving section; the system further comprising:

switching means for receiving information on the presence or absence of an error, which was detected by the encoded data receiving section, and for controlling such that if an error is present, the output from the decoding section is not sent to the memory section while if an error is absent, the output from the decoding section is sent to said memory section.

32. A video sending method comprising the steps of:

encoding an input picture by an inter-picture coding method of compressing data using inter-picture differences, and outputting encoded video data;

receiving a signal from the video receiving side, the signal indicating presence or absence of an error relating to the encoded video data received at the video receiving side and a picture number of the encoded video data;

selecting a reference picture used at the time of encoding among pictures stored in a memory section, which has buffers for maintaining the output encoded video data as reference pictures used for the encoding based on the inter-picture coding method, if at least one picture is stored in the memory section, based on information indicated by the signal received from the video receiving side;

communicating a picture number of the reference picture used at the time of encoding to the video receiving side; and communicating a picture number of the output encoded video data; and the method further comprising the step of:

performing control of data storage of the output encoded video data into the memory section based on information indicated by the signal received by the video sending side, the control including determination whether new data are stored, determination of an area for storing data in the memory section, and deletion of data stored in the memory section.

33. A video sending method as claimed in claim 32, wherein the control of data storage into the memory section includes deletion of reference pictures older than a reference picture used for the newest encoded video data which was correctly received, among reference pictures stored in the memory section.

34. A video sending method as claimed in claim 32, wherein the control of data storage into the memory section includes deletion of a reference picture used for the encoded video data about which a receiving error is communicated from the video receiving side, among reference pictures stored in the memory section.

35. A video sending method as claimed in claim 32, wherein a unit for processing the input picture is selected from the group consisting of a picture, a small area of a picture as a constituent of the picture, and a cluster of pixels which organizes the small area.

36. A video sending method as claimed in claim 32, further comprising the step of:

determining whether the signal from the video receiving side is received within a predetermined time, and outputting information indicating a result of the determination if it is determined that the signal was not received; and wherein if said information is output, the step of performing the control of data storage comprises performing the control based on the information.

37. A video sending method as claimed in claim 32, further comprising the step of:

determining whether the signal from the video receiving side is received while a predetermined number of pictures are encoded, and outputting information indicating a result of the determination if it is determined that the signal was not received; and wherein if said information is output, the step of performing the control of data storage comprises performing the control based on the information.

38. A video sending method as claimed in claim 32, further comprising the step of:

monitoring contents of the memory section, and outputting information if no reference picture usable for the inter-picture coding method exists in the memory section; and wherein if said information is output, the step of encoding an input picture comprises encoding the next picture using an intra-picture coding method.

39. A video sending method as claimed in claim 32, wherein:

the step of encoding an input picture uses both the inter-picture coding method and an intra-picture coding method, and each encoding operation uses any one of said methods, and the video sending method further comprises the step of:

outputting information indicating a situation in which the intra-picture coding method was performed if the situation arose; and wherein when said information is output, the step of performing the control of data storage comprises performing the control based on the information.

40. A video sending method as claimed in claim 32, further comprising:

receiving information from the video receiving side on pictures stored in a memory section of the receiving side;

wherein the step of selecting a reference picture comprises selecting the reference picture based on the information indicated by the received signal communicating the presence or absence of an error and picture number of the encoded video data, and the information on the pictures stored in the memory section of the video receiving side.

41. A storage medium storing a computer program for making a computer execute the method claimed in claim 32.

42. A video receiving method comprising the steps of:

receiving encoded video data output from the video sending side, which were encoded by an inter-picture coding method of compressing data using inter-picture differences, and detecting and outputting presence or absence of an error relating to the video data;

receiving a picture number of the encoded video data communicated from the video sending side;

sending the video sending side a signal which indicates the picture number of the received encoded video data and the detected presence or absence of an error with respect to the relevant video data;

decoding the received encoded video data and outputting decoded video data;

receiving the picture number of the reference picture used at the time of encoding, communicated from the video sending side; and selecting a reference picture used at the time of decoding among pictures stored in a memory section, which has buffers for maintaining the output decoded video data as reference pictures used for the decoding, if at least one picture is stored in the memory section, according to the received picture number of the reference picture; the method further comprising the step of:

communicating information on the pictures stored in the memory section to the video sending side.

43. A video receiving method comprising the steps of:

receiving encoded video data output from the video sending side, which were encoded by an inter-picture coding method of compressing data using inter-picture differences, and detecting and outputting presence or absence of an error relating to the video data;

receiving a picture number of the encoded video data communicated from the video sending side;

sending the video sending side a signal which indicates the picture number of the received encoded video data and the detected presence or absence of an error with respect to the relevant video data;

decoding the received encoded video data and outputting decoded video data;

receiving the picture number of the reference picture used at the time of encoding, communicated from the video sending side; and selecting a reference picture used at the time of decoding among pictures stored in a memory section, which has buffers for maintaining the output decoded video data as reference pictures used for the decoding, if at least one picture is stored in the memory section, according to the received picture number of the reference picture; the method further comprising the step of:

receiving information on the detected presence or absence of an error, and controlling such that if an error is present, the decoded output is not sent to the memory section while if an error is absent, the decoded output is sent to said memory section.

44. A storage medium storing a computer program for making a computer execute the method claimed in claim 42.

45. A storage medium storing a computer program for making a computer execute the method claimed in claim 43.

* * * * *